United States Patent
Norieda

(10) Patent No.: US 10,185,356 B2
(45) Date of Patent: Jan. 22, 2019

(54) INFORMATION INPUT DEVICE, INFORMATION INPUT METHOD, AND INFORMATION INPUT PROGRAM

(75) Inventor: Shin Norieda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 840 days.

(21) Appl. No.: 13/003,794

(22) PCT Filed: Jun. 25, 2009

(86) PCT No.: PCT/JP2009/061606
§ 371 (c)(1),
(2), (4) Date: Jan. 12, 2011

(87) PCT Pub. No.: WO2010/024030
PCT Pub. Date: Mar. 4, 2010

(65) Prior Publication Data
US 2011/0134063 A1 Jun. 9, 2011

(30) Foreign Application Priority Data
Aug. 29, 2008 (JP) .................................. 2008-222933

(51) Int. Cl.
G06F 1/16 (2006.01)
G06F 3/01 (2006.01)
G06F 3/043 (2006.01)

(52) U.S. Cl.
CPC .......... G06F 1/1626 (2013.01); G06F 1/1624 (2013.01); G06F 1/1684 (2013.01); G06F 3/011 (2013.01); G06F 3/0433 (2013.01)

(58) Field of Classification Search
CPC ... G06F 3/014; G06F 2200/1636; G06F 3/011
See application file for complete search history.

(56) References Cited

U.S. PATENT DOCUMENTS 5,805,147 A * 9/1998 Tokioka et al. ................ 345/173
6,380,923 B1 * 4/2002 Fukumoto ............... G06F 1/163
341/22

(Continued)

FOREIGN PATENT DOCUMENTS

JP 2-113317 A 4/1990
JP 5-11919 A 1/1993

(Continued)

OTHER PUBLICATIONS

International Search Report for PCT/JP2009/061606 dated Jul. 21, 2009.

*Primary Examiner* — William Boddie
*Assistant Examiner* — Alecia D. English

(57) ABSTRACT

For input devices of mobile apparatuses placing more importance on the portability and mobile apparatuses placing more importance on display unit such as displays, it is possible to provide an input device and an input method which can easily be operated by a user even if an input unit in the apparatuses is small. The input device includes: an input unit formed by first vibration detection units which detect vibration transmitted via a body of a user holding the input device when a part of the user's body is brought into contact, and a second vibration detection unit; and an input information identification module which calculates a detection time difference between the moment when the vibration is directed by the first vibration detection units and the moment when the vibration is directed by the second vibration detection unit and outputs a code signal corresponding to the time difference.

17 Claims, 30 Drawing Sheets

(56) References Cited

U.S. PATENT DOCUMENTS

| | | | |
|---|---|---|---|
| 2002/0135570 A1* | 9/2002 | Iisaka et al. | 345/177 |
| 2003/0048836 A1* | 3/2003 | Hsieh | G10L 25/48 |
| | | | 375/224 |
| 2009/0131165 A1* | 5/2009 | Buchner et al. | 463/30 |
| 2010/0066664 A1* | 3/2010 | Son et al. | 345/156 |
| 2011/0134083 A1* | 6/2011 | Norieda | G06F 1/1624 |
| | | | 345/177 |

FOREIGN PATENT DOCUMENTS

| | | |
|---|---|---|
| JP | 7-121294 A | 5/1995 |
| JP | 2002190857 A | 7/2002 |
| JP | 2002351614 A | 12/2002 |
| JP | 2004537802 A | 12/2004 |
| JP | 2005258734 A | 9/2005 |
| JP | 3708508 B | 10/2005 |
| JP | 2006323690 A | 11/2006 |
| JP | 2007128304 A | 5/2007 |
| JP | 2008134990 A | 6/2008 |
| WO | 2010024028 A | 3/2010 |
| WO | 2010024029 A | 3/2010 |
| WO | 2010024031 A | 3/2010 |

\* cited by examiner

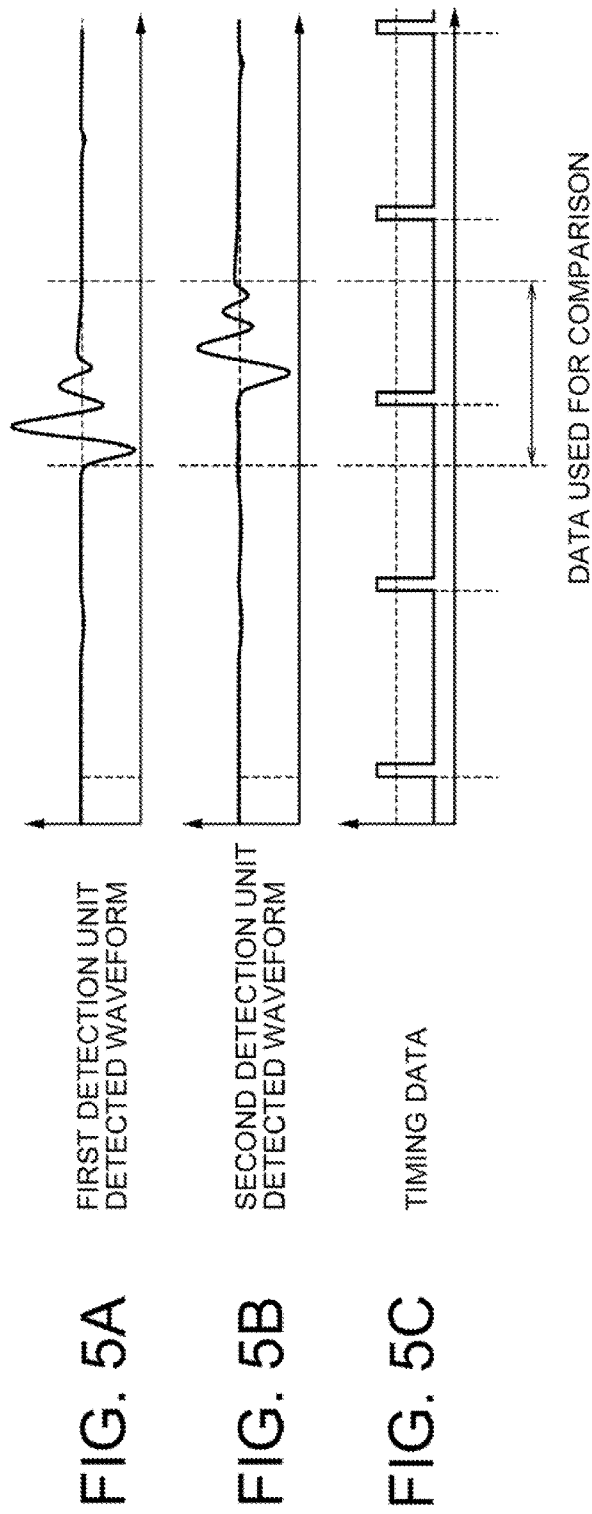

FIG. 8

| | SECOND DETECTION UNIT VIBRATION TRANSMITTING TIME | FIRST DETECTION UNIT VIBRATION TRANSMITTING TIME | TIME DIFFERENCE (ON THE BASIS OF FIRST DETECTION UNIT) |
|---|---|---|---|
| AREA A1 | $\frac{L_1}{2v}+\frac{L_2}{v}+\frac{L_3}{v}$ | $\frac{L_1}{2v}$ | $\frac{-L_2-L_3}{v}$ LEAD |
| AREA A2 | $\frac{L_2}{2v}+\frac{L_3}{v}$ | $\frac{L_1}{v}+\frac{L_2}{2v}$ | $\frac{L_1-L_3}{v}$ |
| AREA A3 | $\frac{L_3}{2v}$ | $\frac{L_1}{v}+\frac{L_2}{v}+\frac{L_3}{2v}$ | $\frac{L_1+L_2}{v}$ DELAYED |

FIG. 11

| INPUT INFORMATION IDENTIFICATION DATA | INPUT AREA | | REACHING TIME DIFFERENCE | |
|---|---|---|---|---|
| | FINGER | POSITION IN FINGER | LOWER-LIMIT THRESHOLD VALUE | UPPER-LIMIT THRESHOLD VALUE |
| ... | ... | ... | ... | ... |
| HA | MIDDLE FINGER | FIRST AREA | -0.016 | -0.009 |
| MA | THIRD FINGER | THIRD AREA | 0.010 | 0.020 |
| YA | THIRD FINGER | SECOND AREA | 0.001 | 0.007 |
| RA | THIRD FINGER | FIRST AREA | -0.015 | -0.008 |
| ... | ... | ... | ... | ... |

FIG. 27

| INPUT INFORMATION IDENTIFICATION DATA | MIDDLE FINGER | | THIRD FINGER | | LITTLE FINGER | |
|---|---|---|---|---|---|---|
| | LOWER-LIMIT THRESHOLD VALUE | UPPER-LIMIT THRESHOLD VALUE | LOWER-LIMIT THRESHOLD VALUE | UPPER-LIMIT THRESHOLD VALUE | LOWER-LIMIT THRESHOLD VALUE | UPPER-LIMIT THRESHOLD VALUE |
| ... | ... | ... | ... | ... | ... | ... |
| SA | -0.025 | -0.020 | -0.020 | -0.015 | -0.013 | -0.009 |
| TA | 0.010 | 0.020 | 0.007 | 0.013 | 0.010 | 0.020 |
| NA | -0.006 | -0.001 | -0.006 | -0.001 | -0.007 | -0.001 |
| HA | -0.019 | -0.015 | -0.025 | -0.020 | -0.020 | -0.016 |
| ... | ... | ... | ... | ... | ... | ... |

FIG. 29

| FIRST AREA (A1) | | SECOND AREA (A2) | | THIRD AREA (A3) | |
|---|---|---|---|---|---|
| AVERAGE | −0.001932 | AVERAGE | 0.000075 | AVERAGE | 0.001573 |
| STANDARD DEVIATION | 0.000391 | STANDARD DEVIATION | 0.000267 | STANDARD DEVIATION | 0.000314 |
| LOWER LIMIT | −0.003104 | LOWER LIMIT | −0.000726 | LOWER LIMIT | 0.000632 |
| UPPER LIMIT | −0.000760 | UPPER LIMIT | 0.000877 | UPPER LIMIT | 0.002514 |

FIG. 30

|  | FIRST AREA | SECOND AREA | THIRD AREA |
|---|---|---|---|
| RELIABLE RANGE : THRESHOLD VALUE BASED ON $\mu \pm 3\sigma$ | ◎ | ◎ | ○ |

INFORMATION INPUT DEVICE, INFORMATION INPUT METHOD, AND INFORMATION INPUT PROGRAM

This Application is the National Phase of PCT/JP2009/061606, filed Jun. 25, 2009, which claims the Priority right based on Japanese Patent Application No. 2008-222933 filed on Aug. 29, 2008 and the disclosure thereof is hereby incorporated by reference in its entirety.

TECHNICAL FIELD

The present invention relates to an information input device and an information input method, which input a command to an information processing device according to an operation done by a user. More specifically, the present invention relates to an information input device and an information input method, which are applied to small mobile apparatuses such as mobile phones, PDAs (personal digital assistants), and notebook PCs (personal computers).

BACKGROUND ART

The portability-oriented mobile apparatuses need to be light in weight and small in size, so that it is necessary to place a display screen and an input unit in a limited space. Further, in accordance with more and more sophisticated functions being provided, the size of the display screen is considered important in the mobile apparatuses. Accordingly, there has been a demand for an information input device with a small key space.

Related techniques for reducing the layout space for keys of an input unit on an apparatus are disclosed in Patent Documents 1 to 7. The related technique disclosed in Patent Document 1 is a technique which places a joystick for detecting tilt angles in the top and bottom as well as left and right directions on an apparatus and changes characters according to the tilt directions.

Further, the related technique disclosed in Patent Document 2 is a technique which discloses a detection unit for detecting operations of a user at a position different from that of a display unit. With this related technique, tactile input protrusions are disposed on a back face side that is on the opposite side from a display screen side of a mobile terminal, and codes are inputted by pressing those.

The related technique disclosed in Patent Document 3 is a technique which separately and individually disposes an input unit and an apparatus. With this related technique, information is inputted by having an input unit loaded to the body of a user. Similarly, Patent Document 4 discloses an input device loaded on a hand of a user.

The related technique disclosed in Patent Document 5 is a technique which provides photosensors by corresponding to five fingers of one hand, and character data is inputted to an apparatus according to a detected pattern of the photosensors. The technique disclosed in Patent Document 6 is a technique which executes communication processing according to vibrations added to a main body of a mobile apparatus. Further, the technique disclosed in Patent Document 7 is a technique which judges an area to which the thumb of a user touches or approaches based on a signal from a detection unit loaded on a user, and generates an information signal according to the judgment result.

Patent Document 1: Japanese Unexamined Patent Publication 2005-258734

Patent Document 2: Japanese Patent No. 3708508

Patent Document 3: Japanese Patent Application Publication 2004-537802

Patent Document 4: Japanese Unexamined Patent Publication Hei 7-121294

Patent Document 5: Japanese Unexamined Patent Publication Hei 2-113317

Patent Document 6: Japanese Unexamined Patent Publication 2002-190857

Patent Document 7: Japanese Unexamined Patent Publication 2007-128304

DISCLOSURE OF THE INVENTION

Problems to be Solved by the Invention

However, with the technique disclosed in Patent Document 1 mentioned above, the corresponding relation between the operation order of the joystick and characters to be inputted is unique and the input operation is complicated. Thus, it takes time for users to get accustomed to the input operation, and input errors may increase. Further, with the technique disclosed in Patent Document 2, a display space is required within the display unit for checking the input position, which spoils the effect achieved by increasing the size of the display. Furthermore, the pitch of the input area is narrow, so that it is difficult to set the position for making an input, for example.

With the techniques disclosed in Patent Documents 3 and 4, it is necessary to prepare an input unit separately from an apparatus, so that the portability is lost. Further, the operator feels a sense of troublesomeness for wearing a detection unit. Furthermore, the technique disclosed in Patent Document 5 is also unique in terms of the corresponding relation between the detected patterns of the photosensors and the character data to be inputted, so that it takes time for the users to get accustomed to the input operation.

With the technique disclosed in Patent Document 6, prescribed communication processing is executed by corresponding to vibration patterns. However, in order to be applied to character input, it is necessary to set a great number of vibration patterns in advance, which is considered impossible. With the technique disclosed in Patent Document 7, it is necessary to prepare a detection unit separately from an apparatus, so that the portability is lost.

It is therefore an object of the present invention to improve the inconveniences of the above-described related techniques, and to provide an information input device, an information input method, and an information input program, which are highly convenience for performing information input to a small information apparatus.

Means for Solving the Problems

In order to achieve the foregoing object, the information input device according to the present invention is characterized to include: a first vibration detection unit which detects a vibration transmitted through body of a user when a part of body of the user is being tapped; a second vibration detection unit which detects a vibration transmitted through the body of the user at a position that is different from a vibration detecting position of the first vibration detection unit in the body of the user; and an input information identification module which calculates a detecting time difference that is a difference of detecting time by having one of the vibrations detected by the first vibration detection unit and detected by the second vibration detection unit as a reference, and identifies the tapped position in the body of the user based on the time difference.

Further, the information input method according to the present invention is characterized to include: detecting a vibration transmitted through body of a user when a part of the body of the user is being tapped, and detecting a vibration transmitted through the body of the user at a position that is different from that vibration detecting position; calculating a detecting time difference that is a difference of detecting time by having one of the two detected vibrations as a reference; and identifying the tapped position in the body of the user based on the time difference.

Furthermore, the information input program according to the present invention is characterized to cause a computer to execute: a function which inputs vibration information outputted from first and second vibration detection units which detect, at different positions in the body of the user, a vibration transmitted through a body of a user when a part of the body of the user is being tapped; a detecting time difference calculating function which calculates a detecting time difference that is a difference of vibration detecting time by having one of the both inputted vibration information as a reference; and an input information identifying function which identifies the tapped position in the body of the user based on the time difference.

EFFECT OF THE INVENTION

With the present invention, the operation space for command input can be provided to a body of a user that is different from the information apparatus. Thus, it is possible to secure the input operation unit that is in a sufficiently large size for the user to operate even if the information apparatus is of a small size. This makes it possible to improve the convenience for inputting information and to reduce input errors.

Further, it is unnecessary to prepare the input operation unit separately from the information apparatus when the operation space is provided to the body of the user. This allows the user not to go through the trouble of wearing the detection device and the like on the body. Furthermore, the user can sense that there is an information input being executed according to a touch to the body, so that it is possible to recognize what kind of information input is being done without looking at the operation part.

BRIEF DESCRIPTION OF THE DRAWINGS

FIG. 5 is an illustration showing detected data of the vibration detection unit according to the exemplary embodiment disclosed in FIG. 1;

FIG. 8 is a chart showing vibration transmitting time for each input area according to the exemplary embodiment disclosed in FIG. 1;

FIG. 11 is a chart showing information stored in a database of the exemplary embodiment disclosed in FIG. 1;

FIG. 27 is a chart showing information stored in a database of the exemplary embodiment disclosed in FIGS. 26A, 26B, and 26C;

FIG. 29 is a chart showing averages and standard deviations of the vibration transmitting time differences of each input area calculated based on the frequency distribution shown in FIG. 28, and the upper limits and lower limits of the threshold values of each input area set based on the averages and the standard deviations; and FIG. 30 is a chart showing the result of an operation experiment conducted by using the threshold values shown in FIG. 29.

BEST MODES FOR CARRYING OUT THE INVENTION

Figure 1:
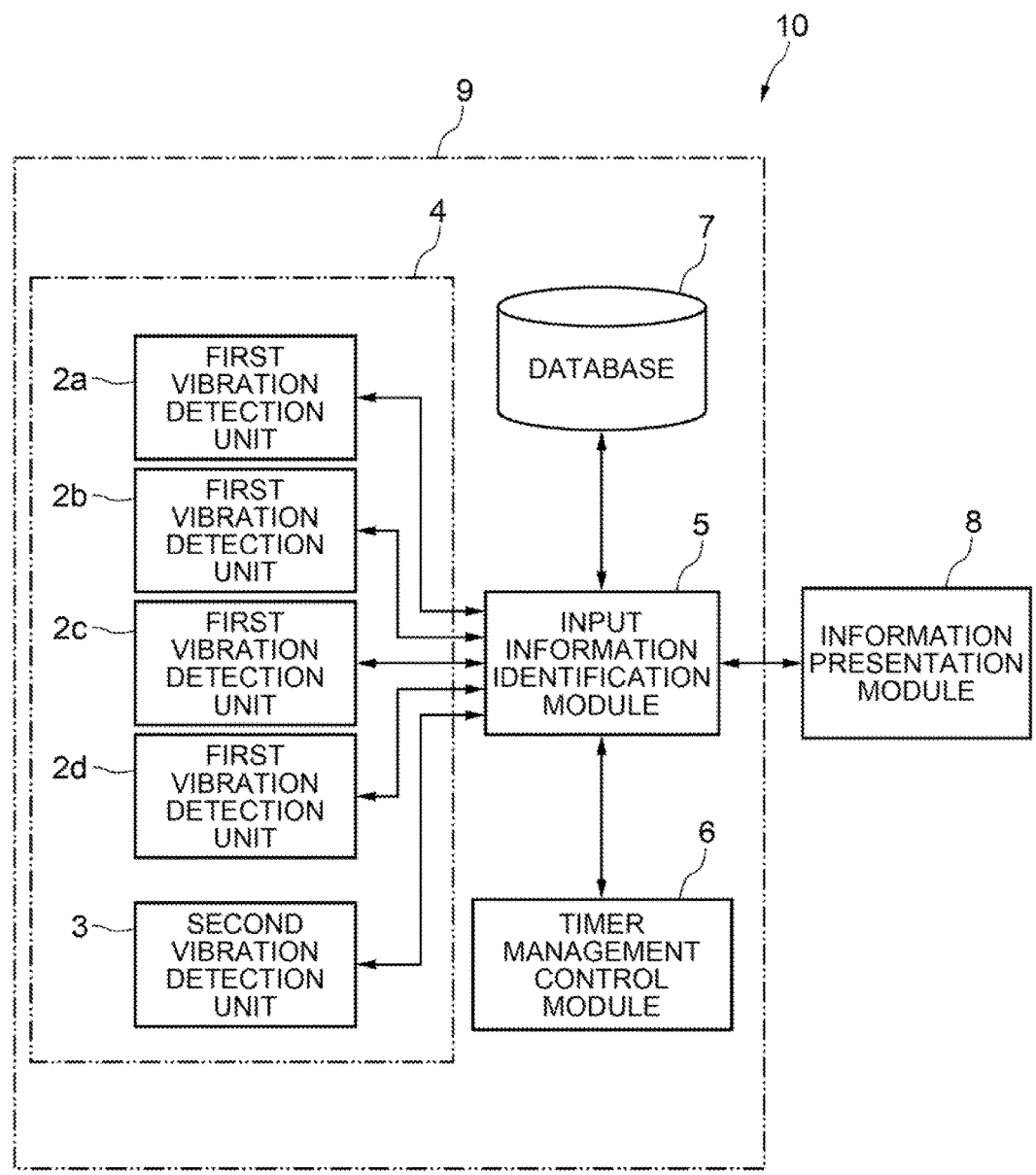
FIG. 1 is a functional block diagram showing the structure of a mobile apparatus according to a first exemplary embodiment of the invention.

Hereinafter, an exemplary embodiment according to the invention will be described by referring to the drawings.

(First Exemplary Embodiment)

FIG. 1 is a functional block diagram showing the structure of a mobile apparatus 10 according to a first exemplary embodiment of the invention. As shown in FIG. 1, the mobile apparatus 10 according to the first exemplary embodiment includes an input device 9 which inputs information such as character codes according to operations of a user.

The input device 9 of the first exemplary embodiment includes: an input unit 4 configured with first vibration detection units 2a, 2b, 2c, 2d for detecting the vibration transmitted inside a body of a user when a user taps on a part of the body of the user and a second vibration detection unit 3 for detecting the vibration at a position different from the positions on the body of the user detected by the first vibration detection units 2a, 2b, 2c, 2d; an input information identification module 5 which calculates the detecting time differences of the vibrations detected by the first vibration detection units 2a, 2b, 2c, 2d and the second vibration detection unit 3, specifies the tapped position in the body of the user based on the time difference, and outputs a code signal corresponding to the tapped position towards an information presentation module 8 side; a timer management control module 6 which sends out timing data to the input information identification module 5; and a database 7 which stores in advance a corresponding table (data table) of the detecting time differences of the vibrations detected by the first vibration detection units 2a, 2b, 2c, 2d as well as the second vibration detection unit 3 and the tapped positions in the body of the user. Note here that the vibrations transmitted via the body of the user include both the vibration propagated inside the body of the user and the vibration propagated on the surface.

Figure 2:
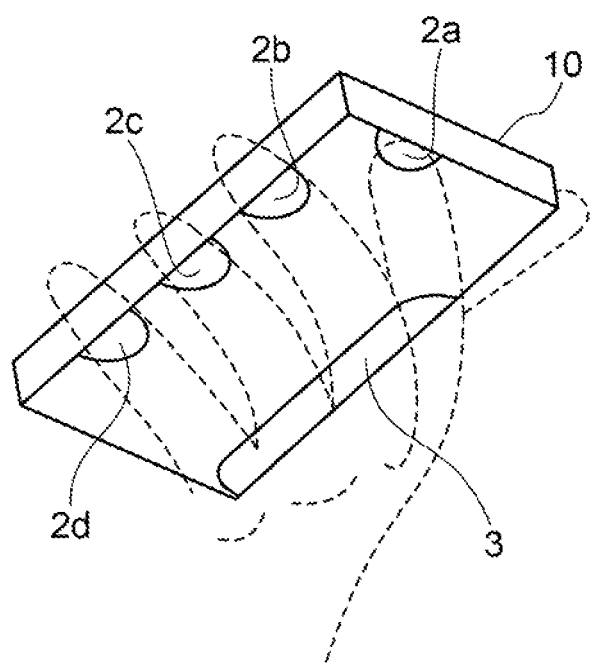
FIG. 2 is an external view of the mobile apparatus according to the exemplary embodiment disclosed in FIG. 1.

FIG. 2 is a perspective view showing the appearance of the mobile apparatus 10 according to the first exemplary embodiment. FIG. 2 shows the back face side of the mobile apparatus 10 viewed through the left hand of a user that holds the mobile apparatus 10. In the mobile apparatus 10 of the first exemplary embodiment, the first vibration detection units 2a, 2b, 2c, 2d as well as the second vibration detection unit 3 are disposed in the positions illustrated in FIG. 2. Through disposing the first vibration detection units 2a, 2b, 2c, 2d as well as the second vibration detection unit 3 in this manner, the tip of the forefinger comes in contact with the first vibration detection unit 2a, the tip of the middle finger comes in contact with the first vibration detection unit 2b, the tip of the third finger comes in contact with the first vibration detection unit 2c, the tip of the little finger comes in contact with the first vibration detection unit 2d, and the base part of the fingers comes in contact with the second vibration detection unit 3 when the user holds the mobile apparatus 10 by the left hand.

Figure 3:
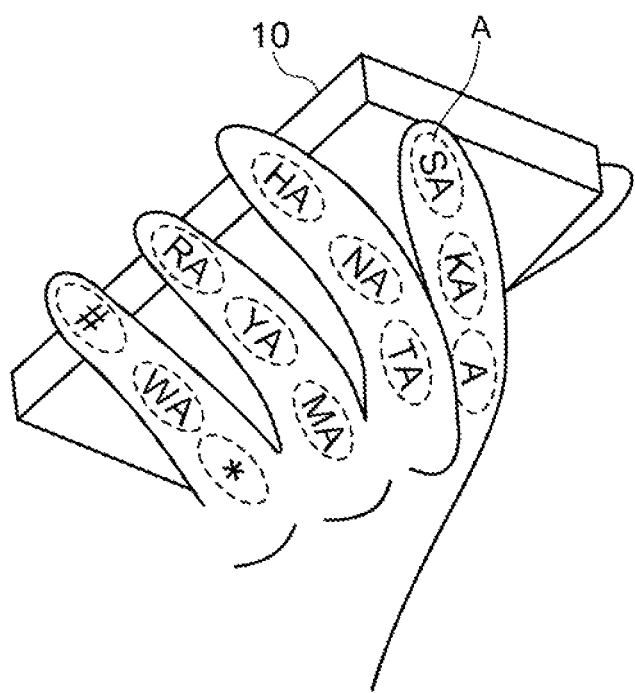
FIG. 3 is an illustration showing the external view of the mobile apparatus according to the exemplary embodiment disclosed in FIG. 1 along with a hand of a user.

FIG. 3 is an explanatory illustration showing a use state of the mobile apparatus 10 according to the first exemplary embodiment. FIG. 3 is an illustration viewed from the back face side of the mobile apparatus 10 in a state where a user holds the mobile apparatus 10 by the left hand. The input device 9 of the first exemplary embodiment is so structured that: when the user taps the finger of the left hand that holds the mobile apparatus 10 with a fingertip of the right hand, the first vibration detection units 2a, 2b, 2c, 2d and the second vibration detection unit 3 detect the vibration propagated on the left hand of the user; and the input information identification module 5 calculates the differences in detected time of the vibrations detected by the first vibration detection units 2a, 2b, 2c, 2d and the second vibration detection unit 3, specifies the position tapped by the user based on the time difference, and outputs a code signal corresponding to the specified tapped position. Through such structure, tapping on the hand of the user can be recognized as an information input operation. Thus, it is unnecessary for the mobile apparatus 10 to load operation keys thereon, so that a large display screen can be secured for that.

In the first exemplary embodiment, in order to discriminate the tapped positions in the left hand of the user that holds the mobile apparatus 10, twelve input areas A in total are set between each joints of the fingers of the left hand as shown in FIG. 3. By assuming the twelve input areas A as ten keys of a mobile phone, keys of "a" to "wa" in Japanese, "*" and "#", which are required for inputting characters, are allotted. Note here that the characters written in the input areas A in FIG. 3 are illustrated for showing each region, and those are not actually drawn on the surface of the skin of the left hand or no member is attached thereon.

The first vibration detection units 2a, 2b, 2c, 2d and the second vibration detection unit 3 are disposed at positions to be in contact with the left hand of the user that holds the mobile apparatus 10, and output detection data to the input information identification module 5 upon detecting the vibration propagated on the left hand by a tap action made on the left hand of the user.

Figure 4:
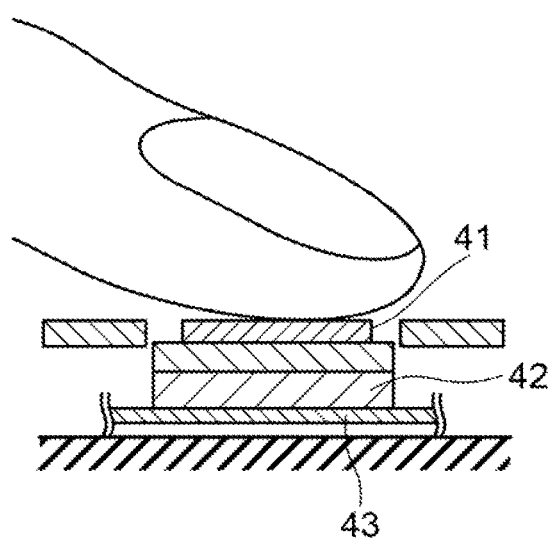
FIG. 4 is a sectional view showing an example of the structure of a vibration detection unit according to the exemplary embodiment disclosed in FIG. 1.

FIG. 4 is a sectional view showing the detailed structure of the first vibration detection units 2a, 2b, 2c, 2d and the second vibration detection unit 3. Each of the first vibration detection units 2a, 2b, 2c, 2d and the second vibration detection unit 3 is formed with a key top 41 to which the fingertip of the user touches, a vibration detecting sensor 42 for detecting compression and elongation in the vertical direction of the sectional view in order to detect the vibration generated by a tap action from the contact face with respect to the fingertip on the key top 41, and a wiring board 43.

Upon receiving the detection data from the first vibration detection units 2a, 2b, 2c, 2d and the second vibration detection unit 3, the input information identification module 5 specifies which of the input areas A is the position of the tap done by the user on the left hand by comparing the detection data with accumulation data of the database 7, in which the physical vibration properties such as bones, muscles, tendons, joints, skin, blood, and the like of the human body are taken into consideration, and outputs a code signal corresponding to the tapped position to the information presentation module 6.

Upon receiving the detection data from the first vibration detection units 2a, 2b, 2c, 2d and the second vibration detection unit 3, the input information identification module 5 extracts data within a prescribed time on the basis of the input action from the detection data as data used for comparison. FIG. 5 is a chart showing examples of vibration waveforms of the detection data detected by the first vibration detection units 2a, 2b, 2c, 2d and the second vibration detection unit 3, respectively, in which (a) of FIG. 5 is an example of the vibration waveform detected by one of the first vibration detection units 2a, 2b, 2c, and 2d, (b) of FIG. 5 is an example of the vibration waveform detected by the second vibration detection unit 3, and (c) of FIG. 5 shows an example of a signal waveform of timing data outputted from the timer management control module 6.

The input information identification module 5 is structured to input detection data at a specific time interval with respect to the timing data received from the timer management control module 6, because there is a large load if the values of the detection data at each time are processed one by one. There may be cases where the data containing all the vibration waveforms cannot be inputted depending on the timing for inputting the detection data. Thus, when detecting the vibration by the first vibration detection units 2a, 2b, 2c, 2d or the second vibration detection unit 3, the detection data within the time of receiving the timing data from the earliest time of detection is inputted as the data used for comparison.

Figure 6A:
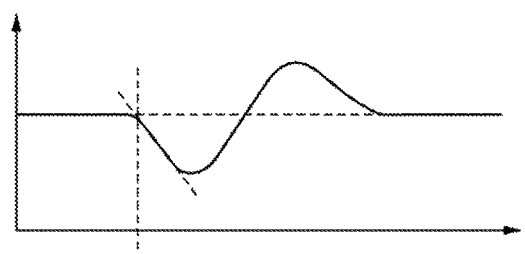
FIG. 6 shows charts showing a vibration detection time specifying method according to the exemplary embodiment disclosed in FIG. 1.
Figure 6B:
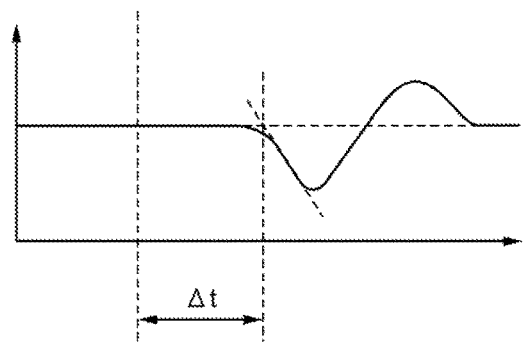

FIG. 6 shows explanatory charts showing the detecting time difference between the vibration detected by one of the first vibration detection units 2a, 2b, 2c, 2d and the vibration detected by the second vibration detection unit 3, in which (a) of FIG. 6 and (b) of FIG. 6 show examples of the vibration detected by one of the first vibration detection units 2a, 2b, 2c, 2d and the vibration detected by the second vibration detection unit 3.

In order to specify the time at which the first vibration detection units 2a, 2b, 2c, 2d and the second vibration detection unit 3 detect the impact made by the tap action as the vibration, the input information identification module 5 extracts the start time of a fall of the vibration waveform. As shown in FIG. 6, the input information identification module 5 is structured to treat the time at an intersection point between a line shown with a horizontal chain line that is the reference of the amplitude of the vibration waveform and a tangent line at a point where the fall of the vibration waveform appears in a greatest level, i.e., a tangent line (an oblique chain line in FIG. 6) of a point at which the displacement speed is the fastest until a point at which the vibration amplitude reaches the smallest value for the first time, as a vibration detected time.

The timer management control module 6 outputs the timing data that is a signal as shown in (c) of FIG. 5 to the input information identification module 5. The time length for using it as the timing data needs to be a longer time interval than a difference between the time at which the vibration transmitted by a tap action of the user reaches the first vibration detection units 2a, 2b, 2c, 2d and the time at which the vibration reaches the second vibration detection unit 3. However, if the time interval is set to be too long, there are such issues that a great part of a memory needs to be occupied and that the update speed as inputs becomes slow, thereby deteriorating the input actions. Thus, the exemplary embodiment is structured to perform input operations by tap actions done on the position closest to the left hand experimentally for one of the first vibration detection units 2a, 2b, 2c, and 2d or the second vibration detection unit 3 in advance, calculate the total value of the time difference at which the both detection units detect the vibration at that time and the time interval until the vibration waveform generated by the tap action input stabilizes by damping, and employs the value as the time interval that is used as the timing data outputted by the timer management control module 6.

Now, the time difference regarding the detection of the vibration transmitted via the finger of the user, which is generated between the first vibration detection units 2a, 2b, 2c, 2d and the second vibration detection unit 3, will be described in details.

Figure 7:
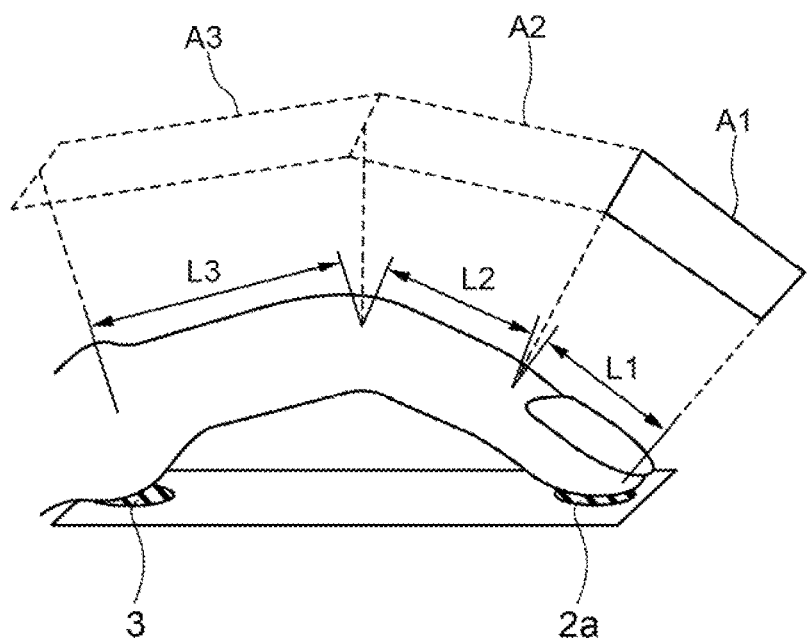
FIG. 7 is an explanatory illustration for describing input areas according to the exemplary embodiment disclosed in FIG. 1.

FIG. 7 is an illustration showing the state where the tip of the forefinger is in contact with the first vibration detection unit 2a, and the base of the forefinger is in contact with the second vibration detection unit 3.

As shown in FIG. 7, three regions from the tip of the forefinger to the first joint, from the first joint to the second joint, and from the second joint to the third joint are defined as a first area A1, a second area A2, and a third area A3, respectively. The finger is configured with bones, muscles, tendons, joints, skin, blood, and the like, and it is a viscous elastic body which transmits an impact made by a tap action as a vibration. Further, the lengths of each of the areas A1 to A3 are defined as L1, L2, and L3, respectively.

FIG. 8 is a chart showing differences between the vibration transmitting time to the first vibration detection unit 2a as well as to the second vibration detection unit 3 and the transmitting time to the both detection units of a case where it is assumed that a vibration by a tap done on each of the areas A1 to A3 is applied to the centers within the areas A1 to A3. When a tap is done on the first area A1, the vibration detected by the second vibration detection unit 3 placed on the finger base side transmits the distance that is the sum of the distance of a half the first area A1, the distance of the second area A2, and the distance of the third area A3. Thus, the vibration reaches by taking the time of "$L1/(2v)+L2/v+L3/v$" from the point at which the tap is conducted. Note here that v indicates the speed of vibration transmitting the finger.

Similarly, the vibration reaching the first vibration detection unit 2a on the fingertip side transmits a half the distance of the first area A1, so that it takes the time of "$L1/(2v)$" from the point at which the tap is conducted. Thereby, the vibration transmitting time difference on the basis of the first vibration detection unit 2a is $-(L2+L3)/v$.

Further, when a tap is conducted on the second area A2, the vibration transmitting time difference on the basis of the first vibration detection unit 2a is $(L1-L3)/v$. The vibration transmitting time difference shows a value close to "0" from the relation between the lengths of L1 and L3. Furthermore, when a tap is conducted on the third area A3, the vibration transmitting time difference on the basis of the first vibration detection unit 2a is $(L1+L2)/v$.

Figure 9:
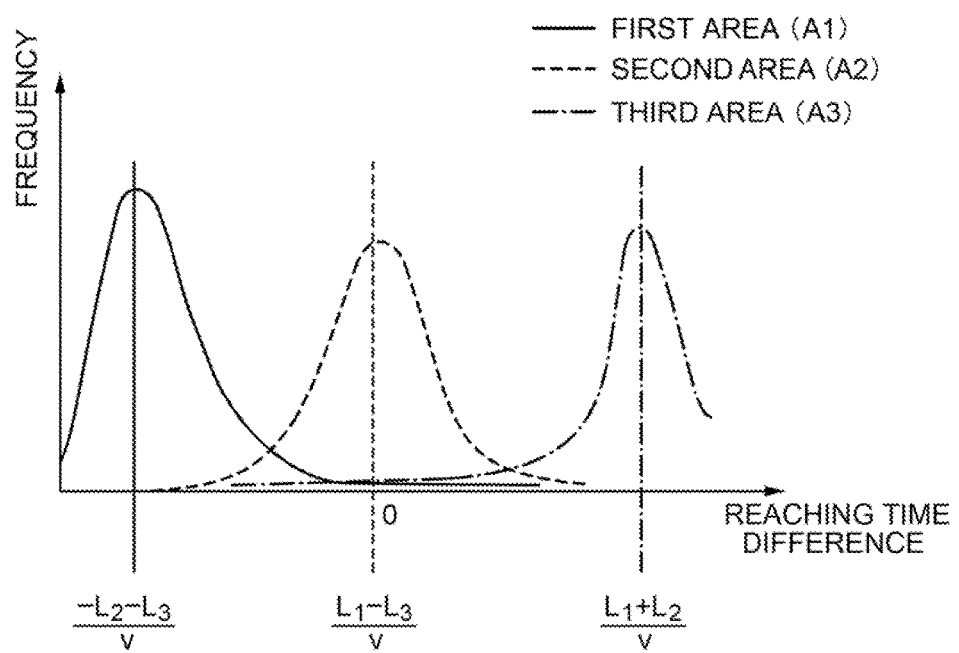
FIG. 9 is a chart showing the frequency distribution of the vibration transmitting time differences for each input area according to the exemplary embodiment disclosed in FIG. 1.

FIG. 9 is a frequency distribution chart showing the differences in the time between the vibration detected by the first vibration detection unit 2a and the vibration detected by the second vibration detection unit 3 when taps for each of the input areas A1 to A3 are executed repeatedly for a plurality of times. As shown in FIG. 9, the frequency distribution of the vibration reaching time difference to each detection unit by the taps on each of the input areas A1 to A3 scatters in a normal distribution. It is the normal distribution centering on the vibration transmitting time difference on the basis of the first vibration detection unit 2a shown in FIG. 8, so that the input information identification module 5 of the first exemplary embodiment is structured to set the upper-limit and lower-limit threshold values for each of the areas A1 to A3, and to judge that there is a tap on the corresponding area when the calculated time difference is included between the both threshold values.

Figure 10:
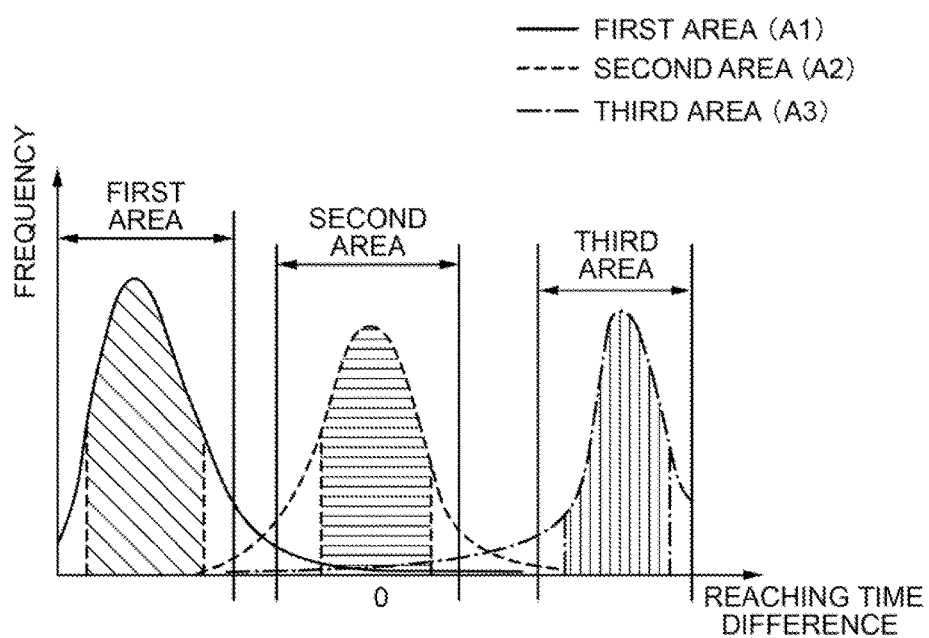
FIG. 10 is a chart showing threshold values of the vibration transmitting time differences for each input area according to the exemplary embodiment disclosed in FIG. 1.

FIG. 10 is a graph showing the threshold values of the vibration transmitting time differences for each of the input areas A1 to A3. As shown in FIG. 10, the vibration transmitting time difference is sectioned at the upper-limit value and the lower-limit value for each of the areas A1 to A3. Since there are a variation in the transmissions of vibrations due to the speed of the vibration transmission depending on the ratio of each structural element of fingers for each operator, a variation in the contact position within a same area even with a same operator, and a variation due to a contact state and the like between the body and the mobile apparatus 10, the exemplary embodiment sets the threshold values on the basis of a standard deviation within a range where the values for judging each of the areas A1 to A3 do not overlap with each other. Further, data of tests executed for a plurality of times including each of the threshold values and the variations of the detection data is saved in the database 7 in advance. In the above, there is described a case where the areas A1 to A3 are set in the forefinger. Through applying those to other fingers such as the middle finger, the third finger, and the little finger, keys of "a" to "wa" in Japanese, "*", and "#", which are ten keys required for inputting characters, can be allotted to the left hand of the user.

FIG. 11 is a chart showing a data table stored in the database 7. This data table is information showing the corresponding relation between the upper-limit threshold values and the lower-limit threshold values of the vibration transmitting time differences regarding each of the first vibration detection units 2a, 2b, 2c, 2d and the second vibration detection unit 3 and code signals (input information data) transmitted to the information presentation module 8. This table data is created by measuring the vibration transmitting time differences when pressing each of the input areas A statistically for a plurality of times in advance, taking the plus and minus of the standard deviation with respect to the average value of the normal distribution as the lower-limit values and the upper-limit values, respectively, and relating those to each of the input areas A. FIG. 11 mainly shows the upper-limit threshold values and the lower-limit threshold values of each of the input areas A of the time differences of the vibration of the third finger, i.e., the vibration detected by the first vibration detection unit 2c and the second vibration detection unit 3.

While it is described to store the threshold values in the database 7, the threshold values may also be captured as a part of a judgment flow executed by the input information identification module 5.

Upon receiving the code signal from the input information identification module 5 of the input device 9, the information presentation module 8 loaded on the mobile apparatus 10 displays a symbol, data, and a function shown by that code signal.

Next, actions of the mobile apparatus 10 of the first exemplary embodiment will be described.

Figure 12:
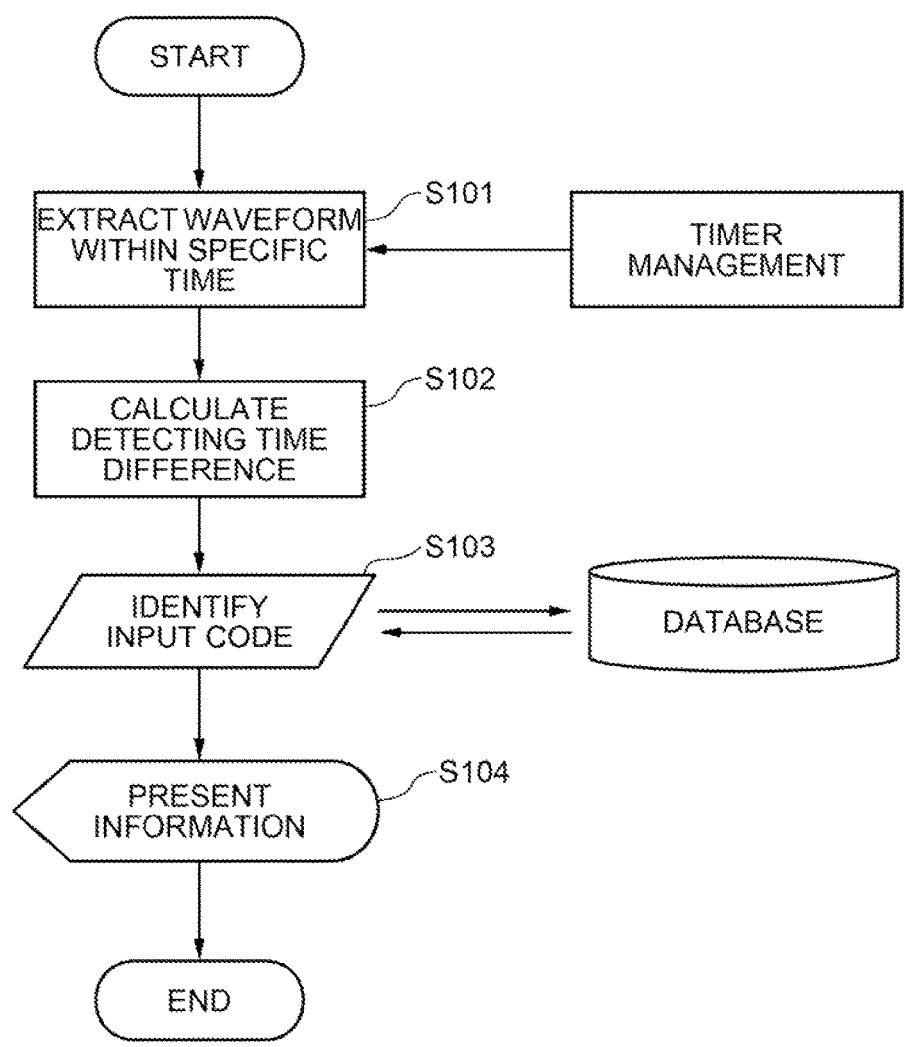
FIG. 12 is a flowchart showing actions of the mobile apparatus according to the exemplary embodiment disclosed in FIG. 1.

FIG. 12 is a flowchart showing the actions of the mobile apparatus 10 according to the first exemplary embodiment. Note here that the explanation of the actions provided hereinafter is an exemplary embodiment of the information input method according to the present invention.

First, when a user performs a tap action for the left hand that holds the mobile apparatus 10 as the input operation to the mobile apparatus 10, one of the first vibration detection units 2a, 2b, 2c, and 2d as well as the second vibration detection unit 3 output a vibration waveform that is a set of the values detected by a vibration detecting sensor 42 by every sampling period to the input information identification module 5 as the detection data, and the input information identification module 5 inputs a vibration waveform signal that is a signal of after a prescribed time has passed from the time at which the input of the detection data is detected on the basis of the time interval shown by the timing data from the timer management control module 6 (step S101 of FIG. 12).

The input information identification module 5 finds the time at which the vibration generated by the input tap action done by the user reaches one of the first vibration detection units 2a, 2b, 2c, and 2d and the time at which the vibration reaches the second vibration detection unit 3 (see FIG. 6), and calculates the reaching time difference based on each time (step S102 of FIG. 12).

The input information identification module 5 reads out the table data saved in the database unit 7 in advance (see FIG. 11), specifies the position tapped by the user based on the calculated time difference, and outputs a corresponding code signal (step S103 of FIG. 12).

Then, the information presentation module 8 receives the code signal from the input information identification module 5, and displays the symbol, the data, and the function corresponding to the code signal (step S104 of FIG. 12).

The mobile apparatus 10 of the first exemplary embodiment operates in this manner and specifies the contact position based on the difference of the transmitting time of the vibration generated by the impact when the user touches the input area due to the difference in the transmitting paths within the body. Thus, it is possible to allot the input areas A for accepting input operations in a part of the body of the user, so that the input unit on the mobile apparatus 10 can be made small.

Now, regarding the input information identification module 5 of the exemplary embodiment, the functional contents thereof may be put into a program to have it executed by a computer.

Further, as shown in FIG. 2, while the first vibration detection units 2a, 2b, 2c, 2d and the second vibration detection unit 3 are disposed in the mobile apparatus 10 by assuming a case of using the left hand of the user as the input unit, it is also possible to use the right hand of the user as the input unit by changing the layout positions of the first vibration detection units 2a, 2b, 2c, 2d and the second vibration detection unit 3.

Furthermore, in the mobile apparatus 10, the first vibration detection unit may be provided at a position corresponding to the thumb of the user. By providing the detection unit corresponding to the thumb, an input area A corresponding to a "clear" key and "finalization" key can be secured. Moreover, while "a" to "wa" in Japanese are used as prescribed symbols and data allotted to the code signals in the information presentation module 8, English letters such as "A" to "Z" or numeral figures such as "0" to "9" may also be employed.

Figure 13:
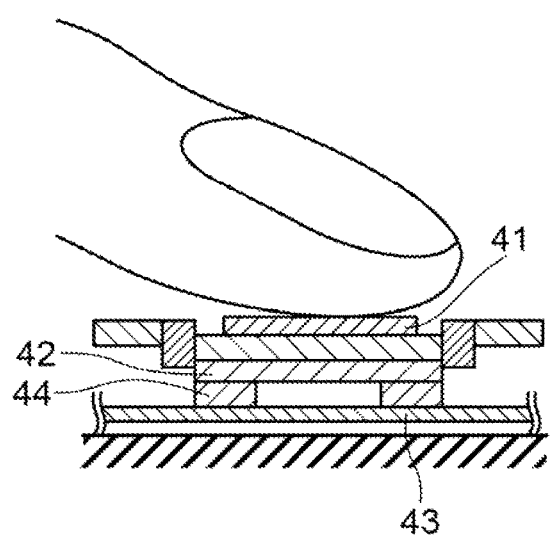
FIG. 13 is a sectional view showing another example of the structure of the vibration detection unit according to the exemplary embodiment disclosed in FIG. 1.

Further, regarding the structure of the first vibration detection units 2a, 2b, 2c, 2d and the second vibration detection unit 3, as shown in FIG. 13, a vibration-proof material 44 for damping the vibration may be provided in a part that is in contact with the casing, such as on the bottom side of the vibration detecting sensor 42, at the end of the key top 41, etc. This makes it possible to lighten the noise to the other vibration detection units.

Further, it is also possible to provide a band-pass filter, a smoothing filter, or the like for cutting the frequency band other than the frequency used as the impact by the tap actions of the user for the values of the detection data outputted from the first vibration detection units 2a, 2b, 2c, 2d and the second vibration detection unit. With such structure, the noise can be eliminated.

Furthermore, the layout positions of the first vibration detection units 2a, 2b, 2c, 2d and the second vibration detection unit 3 may be at any positions, as long as the body of the user can be in contact therewith. Moreover, while the second vibration detection unit 3 is used in common to all the fingers, it is also possible to provide the detection units exclusively for each finger.

Figure 14A:
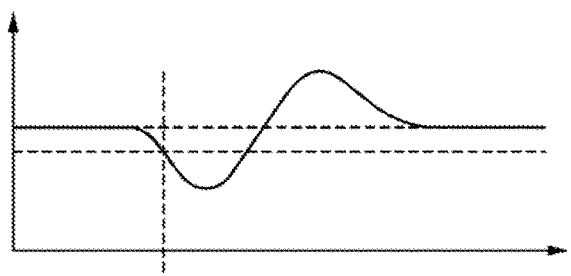
FIG. 14 shows charts showing another example of the vibration detection time specifying method according to the exemplary embodiment disclosed in FIG. 1.
Figure 14B:
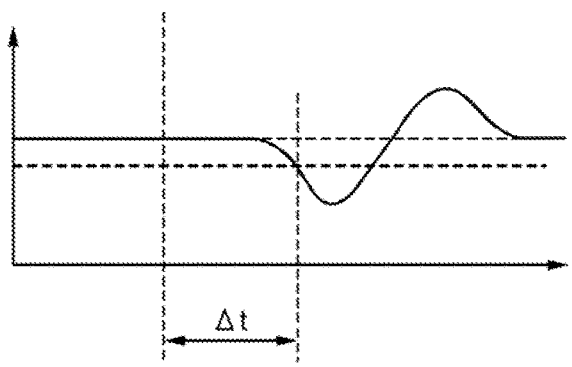
Figure 15A:
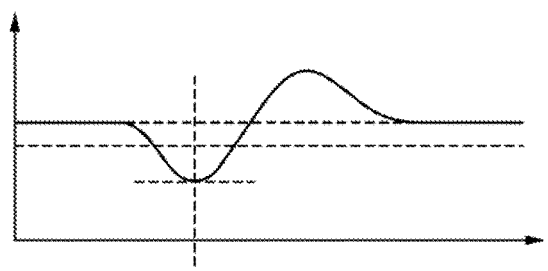
FIG. 15 shows charts showing another example of the vibration detection time specifying method according to the exemplary embodiment disclosed in FIG. 1.
Figure 15B:
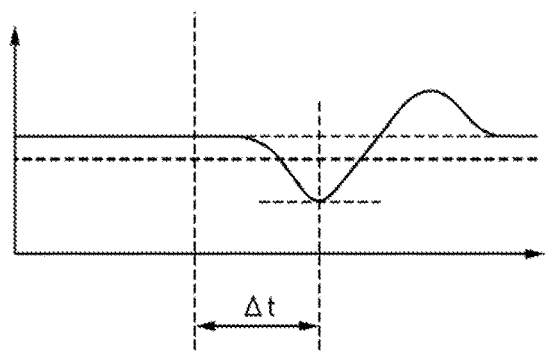

Further, the input information identification module 5 may operate by taking the vibration detecting time as the time at which the amplitude of the vibration waveform exceeds a threshold value (see FIG. 14) or may operate by taking the vibration detecting time as the time of the waveform minimum value (see FIG. 15). With such detecting time, it is easy to extract the detecting time even though there is often an influence of the values of the noises and the like.

Further, the input areas A are not limited only to the hand and the fingers of the user but may be applied to each part of the body. For example, the user may stand on the mobile apparatus 10 to acquire the vibration transmission in the soles of the left and right feet by the first detection units, and specify the positions of the tap actions done on the knees and thighs.

Further, the mobile apparatus 10 of the exemplary embodiment can be used by those who have a disability in their bodies and wear an artificial limb. For example, it is possible to identify an input action by acquiring the vibration transmitted within a fingertip of an artificial hand or artificial fingers by the first vibration detection unit 2a.

As described, with the mobile apparatus 10 of the first exemplary embodiment, it is possible to secure the input space that is sufficiently large in size for executing operations through allotting the input unit for accepting the operations to the body of the user. Thus, the operability can be improved, and the input errors as well as the input time can be reduced. Further, the user can sense that there is an input based on a touch to the body, so that it is possible to recognize which of the positions the input is made without looking at the operation part. Further, the detection units for detecting input operations are only provided at the contact parts between the apparatus and the body. Thus, there is no troublesome work of winding the detection unit members to the body, and it is excellent in terms of the portability.

Next, specific EXAMPLE based on the first exemplary embodiment will be described.

In this EXAMPLE, a bone-conductive microphone that was formed by molding a resin into an element that changes the resistance value by strain was used as the vibration detecting sensor 42 (see FIG. 4) loaded on the first vibration detection units 2a, 2b, 2c, 2d and the second vibration detection unit 3 shown in FIG. 1 for detecting the vibration transmitted through the body of the holder.

Further, as shown in FIG. 3, the second vibration detection unit 3 was disposed in the base part of the forefinger of the holder and the first vibration detection unit 2a was disposed to be in contact with the fingertip part of the forefinger, and the vibration transmitted within the body of the holder was detected when a contact was made to the input area A of the handing the apparatus. The values in the accumulation data in the database 7 used when the input information identification module 5 discriminates which of the input areas A the tap operation was conducted were acquired by conducting an experiment.

Figure 28:
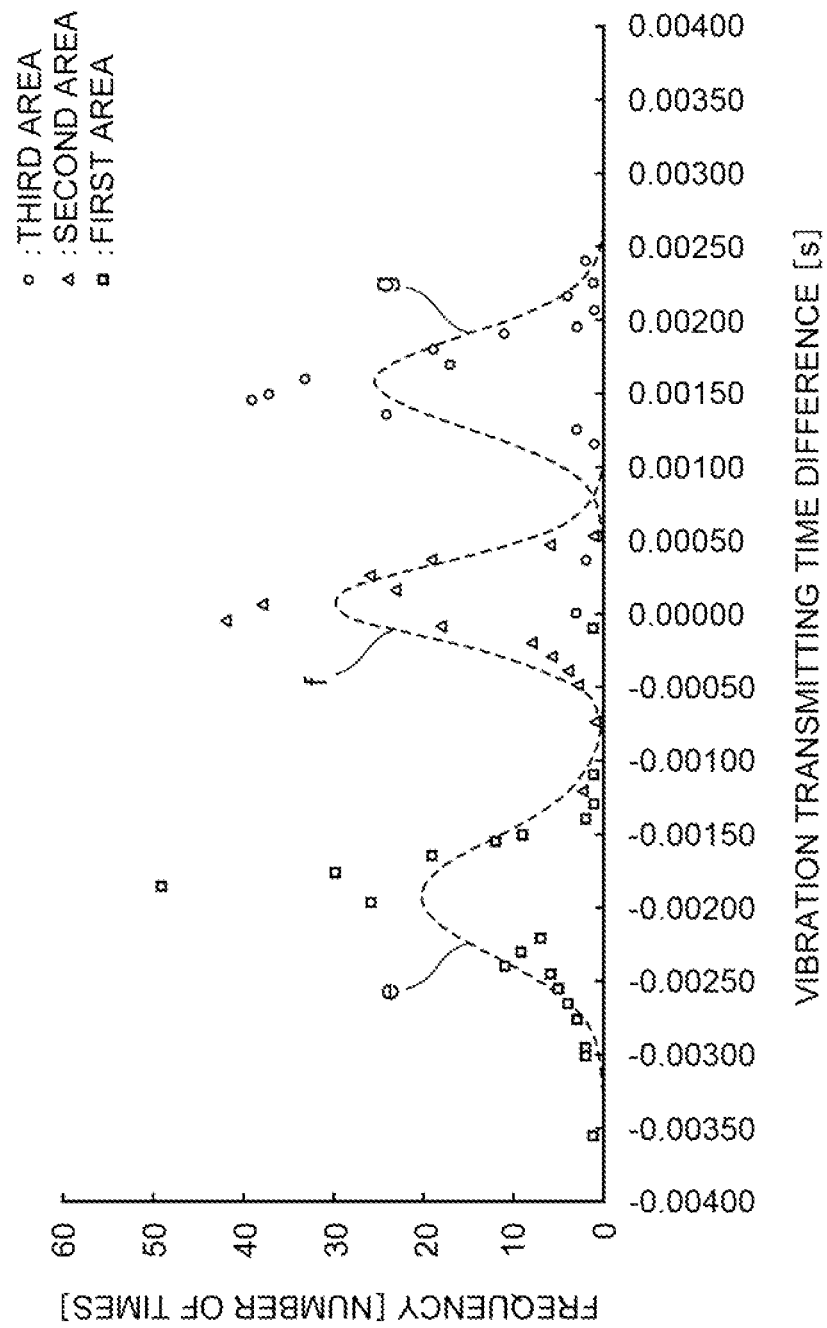
FIG. 28 is a graph showing a frequency distribution of the vibration transmitting time differences for each input area in EXAMPLE of the exemplary embodiment disclosed in FIG. 1.

FIG. 28 is a chart showing a corresponding relation between the time difference in the vibration detected at the first vibration detection unit 2a and detected at the second vibration detection unit 3 and the frequency thereof, when taps are repeatedly done on the input areas A1, A2, and A3 shown in FIG. 7.

Push-in operations of about two-hundred times each were conducted on each of the input areas A1, A2, and A3, the arriving time difference of the vibration detected by the first vibration detection unit 2a and by the second vibration detection unit 3 was calculated every time, and the detection frequencies of each time range were calculated by sectioning the time differences of each time into a time range of 0.00005 (s) interval. FIG. 28 is a frequency distribution graph in which the lateral axis is the time difference (the vibration transmitting time difference) of the signal waveforms detected by the first vibration detection unit 2a and the second vibration detection unit 3, and the longitudinal axis is the detection frequency. The detection frequencies of each time range of 0.00005 (s) interval are plotted in "□" for the first input area A1, and in "Δ," for the second input area A2, and in "○" for the third input area A3.

Further, in each of the input areas A1, A2, and A3, the variations in the vibration transmitting time differences are considered to be normal distributions, and the graph of the normal distributions can be expressed as Expression 1 with average value μ and standard deviation σ. Thus, the normal distributions in each of the input areas A1, A2, and A3 in the graph become as follows: the first area—normal distribution (e of FIG. 28), the second area—normal distribution (f of FIG. 28), and the third area—normal distribution (g of FIG. 28). From FIG. 28, it can be seen that there is no problem even when the variations in the vibration transmitting time differences are considered as the normal distributions.

$$f(x) = \frac{1}{\sqrt{2\pi} \cdot \sigma} \exp\left\{\frac{-(x-\mu)^2}{2\sigma^2}\right\}$$ (Expression 1)

FIG. 29 is a cart showing the lower limit values and the upper limit values of the threshold values of the vibration transmitting time differences for identifying the input areas A1, A2, and A3. FIG. 29 shows the average values μ of the vibration transmitting time differences of the input areas A1, A2, A3 and the standard deviations σ calculated from the vibration transmitting time differences and the frequency thereof shown in FIG. 28, and the lower limit values and the upper limit values of the threshold values of each of the input areas A1, A2, A3 calculated based on the respective average values μ and the standard deviations σ.

The lower limit values and the upper limit values for each of the input areas A1, A2, and A3 shown in FIG. 29 are calculated based on a reliable range "μ±3σ" that is the reliability of 99.73%. Regarding the ranges of the respective upper limit values and the lower limit values, the values do not overlap with each other in the first area A1 and the second area A2, while the values overlap with each other in the second area A2 and the third area A3. The lower limit value of the third area A3 is smaller than the upper limit value of the second area A2.

Regarding the threshold values in the overlapping area, a threshold value in common to the both areas are acquired and supplied from the values of both ends of the overlapping area according to a ratio of the standard deviations of each input area. Specifically, in FIG. 29, a division ratio is acquired according to a ratio between the standard deviation "0.000314" of the third area A3 and the standard deviation "0.000267" of the second input area A2 for setting the threshold value between the lower limit value "0.000632" of the third area A3 and the upper limit value "0.000877" of the second area A2. Thereby, "0.000745" is taken as the final threshold value for specifying the border between the second area A2 and the third area A3. This threshold value corresponds to the standard deviation "76.36" for the third area A3 and the standard deviation "75.09" for the second area 12, which is a reliable range with a high reliability.

FIG. 30 is a chart showing the result of an operation experiment executed on each of the input areas A1, A2, and A3 by employing each of the threshold values set based on each of the values shown in FIG. 29. In this operation experiment, one of the input areas A1, A2, and A3 was designated randomly, prescribed symbol, data, and functional content related to the designated input area was displayed by the information presentation module 8, the operator performed a tap operation to the input area corresponding to the display, and the correct/incorrect regarding the tapped position identified by the input information identification module 5 according to the tap operation and the designated input area displayed earlier was judged.

FIG. 30 is a chart showing the correct percentage of the tapped positions identified by the input information identification module 5 according to the threshold values set based on the reliable range "$\mu \pm 3\sigma$" when the experiments of about one thousand times were executed by designating the input areas randomly. Regarding the correct percentages for each of the input areas A1, A2, and A3, the correct percentage of 95% or higher is shown by "⊚", the correct percentage of 90% or higher and less than 95% is shown by "○", and the correct percentage of less than 90% is shown by "x". As shown in FIG. 30, through setting the threshold values of the vibration transmitting time differences for each of the input areas A as in the case of EXAMPLE, the input information identification module 5 becomes capable of identify the tapped positions accurately, thereby increasing the reliability of the input device 9.

(Second Exemplary Embodiment)

Next, a second exemplary embodiment of the invention will be described.

Figure 16A:
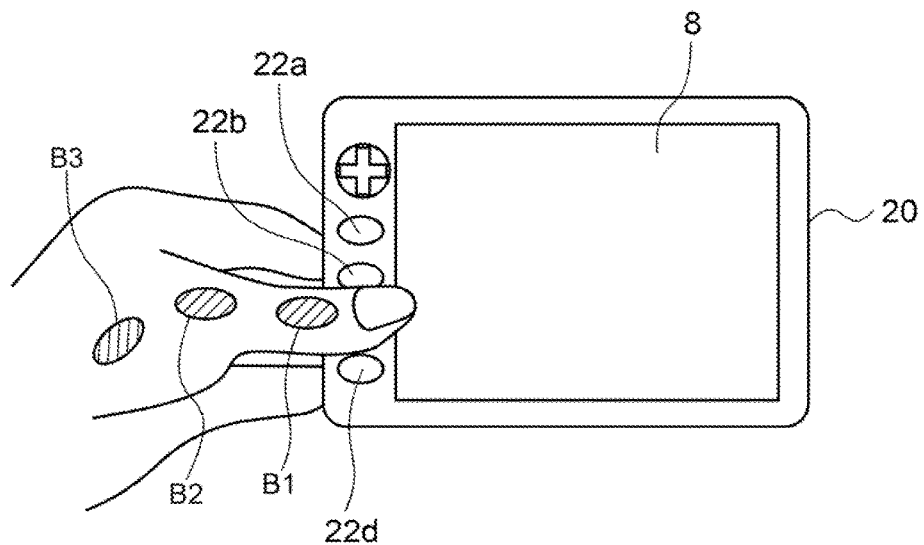
FIGS. 16A and 16B show external views of a mobile apparatus according to a second exemplary embodiment of the invention.
Figure 16B:
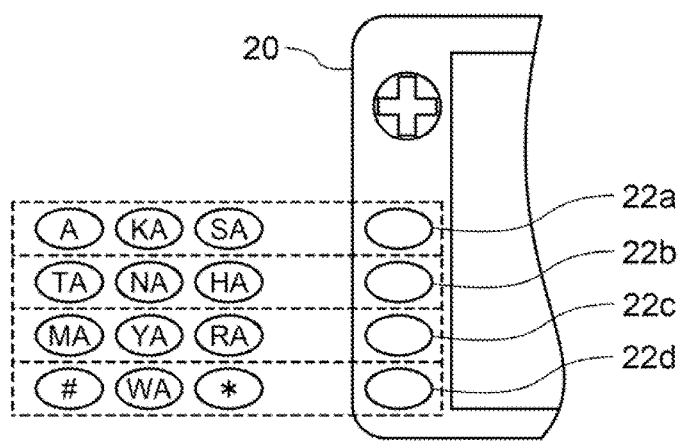
Figure 17:
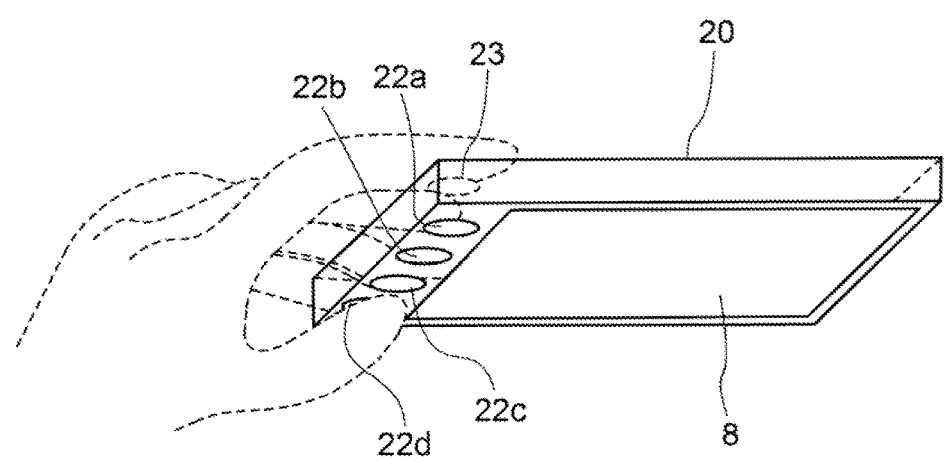
FIG. 17 is an external view of the mobile apparatus according to the exemplary embodiment disclosed in FIGS. 16A and 16B.

FIGS. 16A, 16B and FIG. 17 are illustrations showing the external view of a mobile apparatus 20 according to the second exemplary embodiment. As shown in FIG. 16A, FIG. 16B, and FIG. 17, the mobile apparatus 20 according to the second exemplary embodiment includes first vibration detection units 22a, 22b, 22c, 22d on the front face of a card-size casing, and includes a second vibration detection unit 23 on the back face of the casing. As shown in FIG. 16A, when the thumb of a user touches one of the first vibration detection units 22a, 22b, 22c, and 22d, input areas B can be allotted between each of the joints of the back side of the thumb. As shown in FIG. 16B, in the second exemplary embodiment, prescribed symbols, data, and functions are allotted by combinations of each input area B of one finger and the first vibration detection units 22a, 22b, 22c, 22d.

In the second exemplary embodiment, when the fingertip of the thumb of the user touches the first vibration detection unit 22a on the uppermost side and another finger of the same hand touches the second vibration detection unit 23, the area B1 functions as an area corresponding to "sa" key in Japanese, the area B2 functions as "ka" key, and the area B3 functions as an area corresponding to "a" key. In a case where the fingertip of the thumb touches the first vibration detection unit 22b on the second uppermost side, the area B1 functions as an area corresponding to "ha" key, the area B2 functions as "na" key, and the area B3 functions as an area corresponding to "ta" key. As described, the input device 29 of the second exemplary embodiment can change the prescribed symbols, data, and functions allotted to the input areas B depending on which of the first vibration detection units 22a, 22b, 22c, and 22d the thumb touches.

Figure 18:
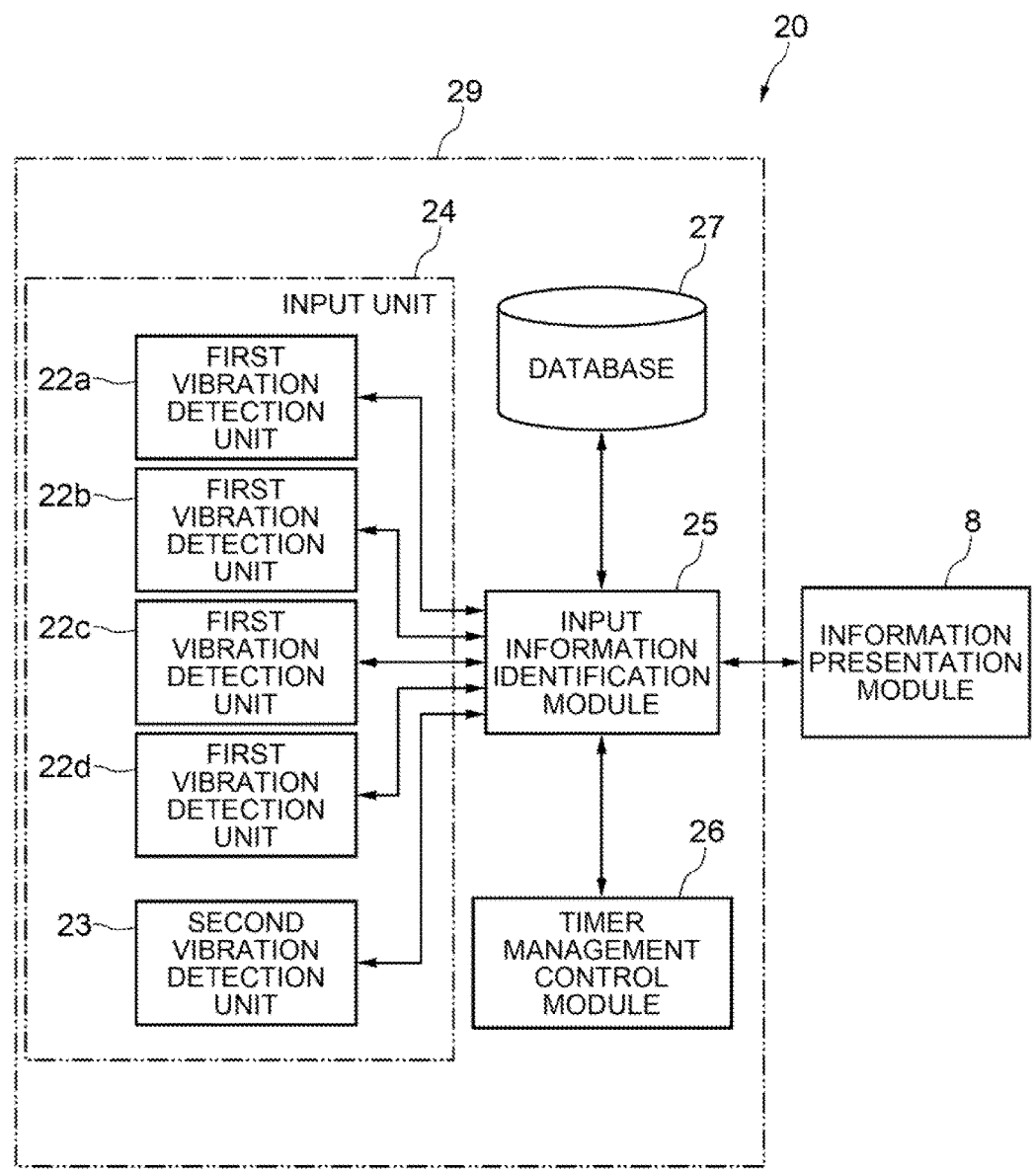
FIG. 18 is a functional block diagram showing the structure of the mobile apparatus according to the exemplary embodiment disclosed in FIGS. 16A and 16B.

FIG. 18 is a functional block diagram showing the structure of the mobile apparatus 20 according to the second exemplary embodiment. As shown in FIG. 15, as in the case of the mobile apparatus 10 according to the first exemplary embodiment, the mobile apparatus 20 of the second exemplary embodiment is structured by including: an input unit 24 configured with the first vibration detection units 22a, 22b, 22c, 22d and the second vibration detection unit 23; the input device 29 including an input information identification module 25, a timer management control unit 26, and a database 27; and an information presentation module 8.

The first vibration detection units 22a, 22b, 22c, 22d and the second vibration detection unit 23 detect vibrations of contact objects, and output detection data that is time series data of the vibrations.

Upon receiving the detection data from the first vibration detection units 22a, 22b, 22c, 22d and the second vibration detection unit 23, the input information identification module 25 identifies the tapped input area B by comparing the detection data with the data table stored in the database 27 in advance in order to reflect only the physical vibration properties to detection of the input positions by taking the bones, muscles, tendons, joints, skin, blood, and the like of the body of the user into consideration, and outputs a code signal corresponding to that position.

Figure 19:
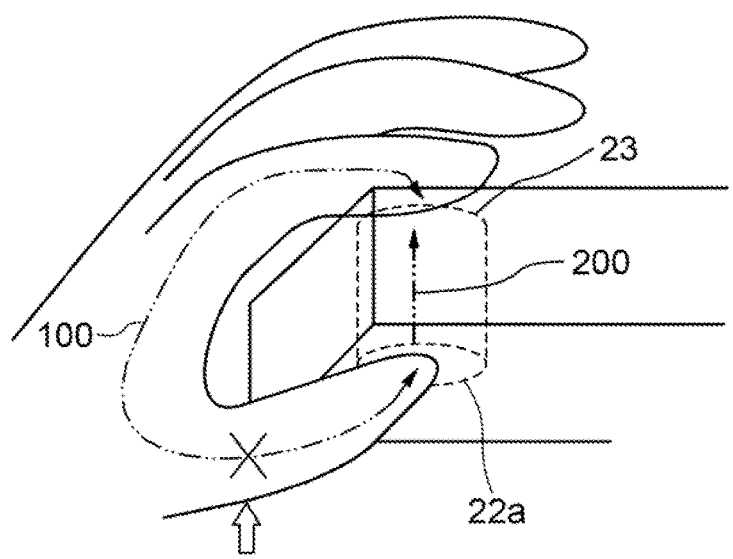
FIG. 19 is an explanatory illustration for describing a vibration transmitting path according to the exemplary embodiment disclosed in FIGS. 16A and 16B.

As shown in FIG. 17, in the mobile apparatus 20 of the second exemplary embodiment, the first vibration detection unit 22a and the second vibration detection units 23 are placed at positions so as to detect the vibrations of the coaxial direction. Therefore, as shown in FIG. 19, the second vibration detection unit 23 detects a vibration wave that is synthesized wave of the vibrations from the two vibration transmitting paths, i.e., the vibration transmitting path 100 transmitting on the hand of the user and an in-apparatus transmitting path 200 transmitting inside the apparatus.

Thereby, the input information identification module 25 extracts only the vibration waveform transmitted on the body transmitting path 100 from the vibration waveform that is detected with a lag among the vibrations detected by the first vibration detection unit 22a and the second vibration detection unit 23, and performs arithmetic operation processing for identifying the contact position.

Figure 20:
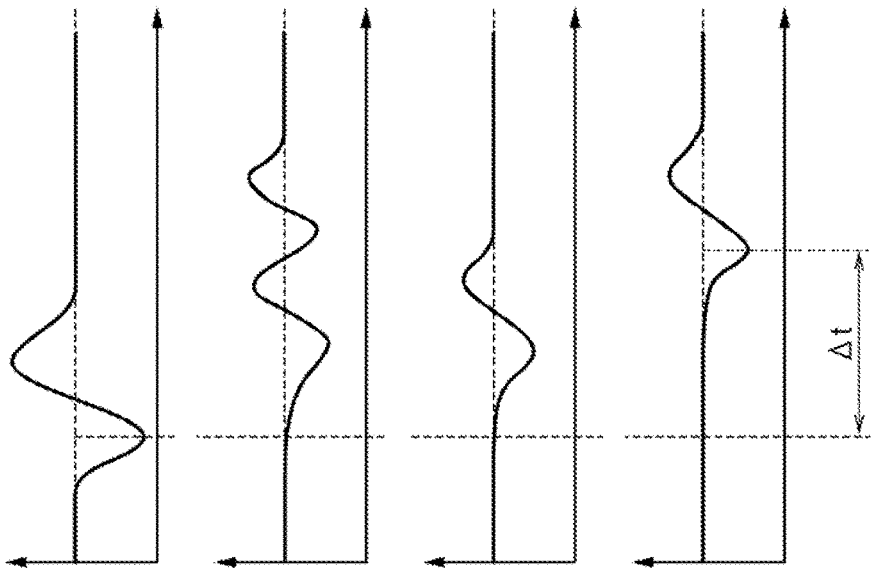
FIG. 20 is an explanatory chart regarding in-apparatus transmission waveforms according to the exemplary embodiment disclosed in FIGS. 16A and 16B.

FIG. 20 shows charts of a process of extracting the vibration waveform of the body transmitting path 100 from the synthesized wave, in which (a) of FIG. 20 shows a signal waveform outputted from the first vibration detection unit 22a, and (b) of FIG. 20 shows a signal waveform outputted from the second vibration detection unit 23. As shown in (b) of FIG. 20, the second vibration detection unit 23 detects the synthesized wave of the vibration from the body transmitting path 100 transmitting inside the body of the user and the vibration from the in-apparatus transmitting path 200 transmitting inside the apparatus.

The input information identification module 25 uses a transmission function of a case where the vibration transmits inside the apparatus, and multiplies the transmission function to the vibration waveform detected by the first vibration detection unit 22a to calculate an estimated waveform of a case where the vibration passes through the in-apparatus transmitting path 200. Note that (c) of FIG. 20 shows an estimated waveform of a case where the signal waveform (see (a) of FIG. 20) outputted from the first vibration detection unit 22a reaches the second vibration detection unit 23 through the in-apparatus transmitting path 200. As shown in (c) of FIG. 20, this estimated value is a vibration waveform having a time lag from the vibration waveform detected by the first vibration detection unit 22a.

The input information identification module 25 subtracts the estimated waveform from the vibration waveform detected by the second vibration detection unit 23 to calculate a vibration waveform that reaches the second vibration detection unit 23 through the body transmitting path 100. Note that (d) of FIG. 20 shows a vibration waveform that reaches the second vibration detection unit 23 from the body transmitting path 100.

As described, the input information identification module 25 performs processing for reflecting only those physical vibration properties to the input position detections, and calculates the detecting time difference of the vibration generated by the tap action of the user by using the vibration waveform (see (a) of FIG. 20) detected by the first vibration detection unit 22a and the vibration waveform (see (d) of FIG. 20) detected by the second vibration detection unit 23 from the body transmitting path 100.

Now, the processing of the input information identification module 25 executed for calculating the estimated waveform of a case where the vibration Waveform detected by the first vibration detection unit 22a passes through the in-apparatus transmitting path 200 will be described in details.

Figure 21:
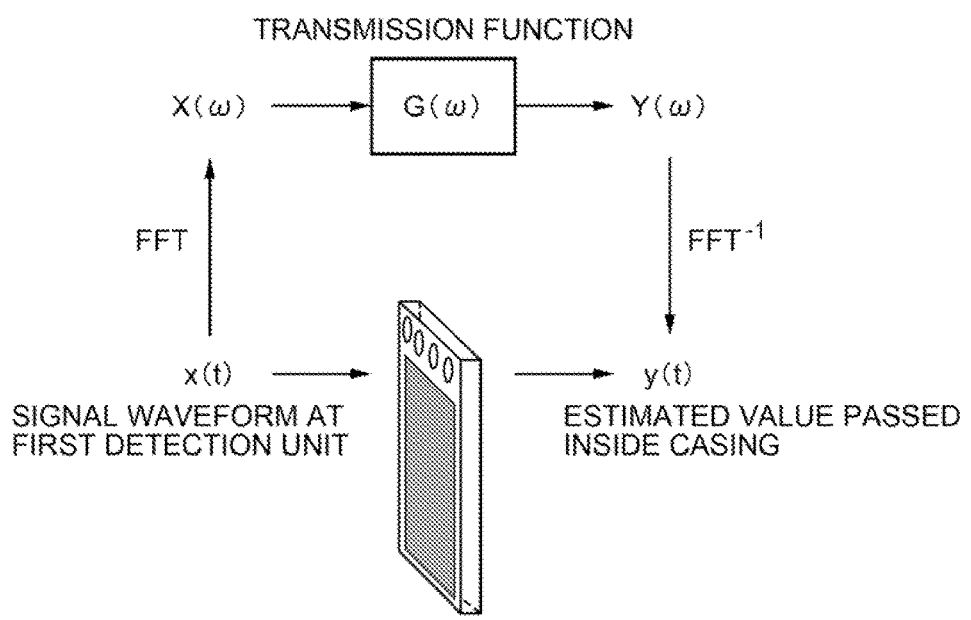
FIG. 21 is an explanatory illustration regarding the in-apparatus transmission waveforms according to the exemplary embodiment disclosed in FIGS. 16A and 16B.

FIG. 21 is an explanatory illustration showing the processing for calculating the waveform when the vibration detected by the first vibration detection unit 22a reaches the second vibration detection unit 23 through the in-apparatus transmitting path 200 by using a frequency transformation.

In order to calculate the estimated value of the vibration waveform when the vibration waveform detected by the first vibration detection unit 22a reaches the second vibration detection unit 23 through the in-apparatus transmitting path 200, the input information identification module 25 first transforms a vibration waveform x(t) detected by the first vibration detection unit 22a from the time region to the frequency region to calculate a function $X(\omega)$. The vibration waveforms transmitting through the hand by tap actions done by the user are vibration waveforms including various frequencies. There are differences in damping of the vibration and phase delay for each frequency component regarding the vibration waveforms transmitting through the body transmitting path 100 and the in-apparatus transmitting path 200, so that it is necessary to perform transformation to the frequency region. This exemplary embodiment is structured to perform transformation by using Fast Fourier Transformation (FFT).

Figure 22:
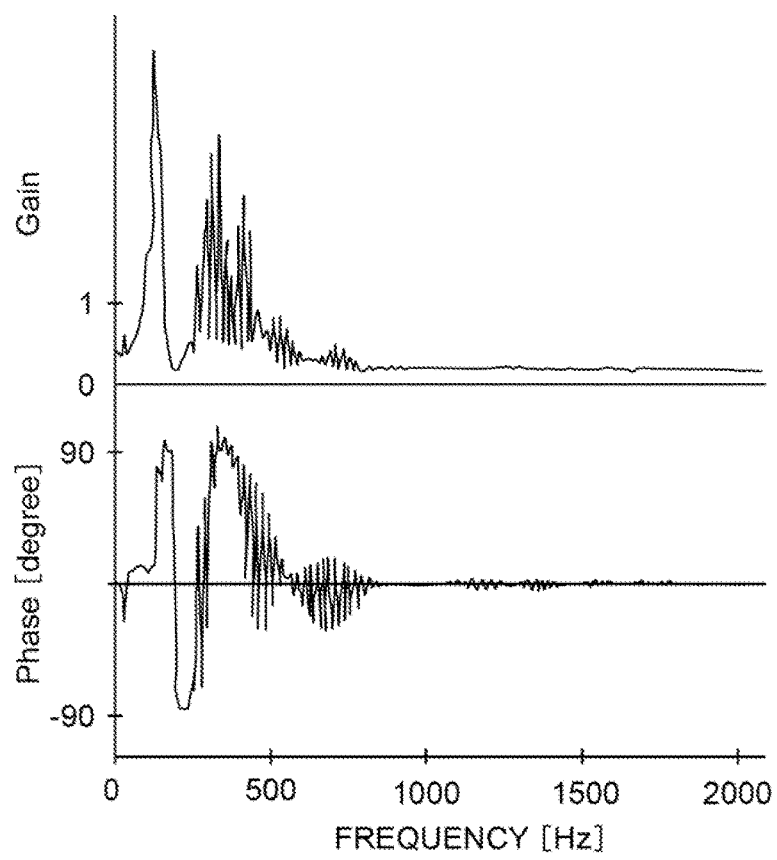
FIG. 22 is a chart showing an example of a transmission function according to the exemplary embodiment disclosed in FIGS. 16A and 16B.

Further, the input information identification module 25 performs integration of the function $X(\omega)$ transformed to the frequency region and in-terminal transmission function $G(\omega)$. FIG. 22 is a chart showing the transmission function inside a terminal. As shown in FIG. 22, an output vibration with respect to an input vibration when the vibration passes through the in-apparatus transmitting path 200 can be calculated with "Gain" that is the amplitude ratio of the vibration by each frequency and "Phase" that is the vibration phase difference. Assuming that the vibration waveform detected by the first vibration detection unit 22a is the input waveform of the vibration waveform passing through the in-apparatus transmitting path 200, only the vibration waveform reached through the in-apparatus transmitting path 200 among the vibration waveforms detected by second vibration detection unit 23 can be calculated by performing integration with the transmission function $G(\omega)$.

The function $X(\omega)$ of the frequency region of the vibration waveform detected by the first vibration detection unit 22a and the transmission function $G(\omega)$ can be expressed in a polar form of "$A(\omega)\exp(j\varphi(\omega))$" where "Gain" is the amplitude spectrum $A(\omega)$ and the "Phase" is the phase spectrum $\varphi(\omega)$. Note here that "$\omega$" is a frequency, and "j" is an imaginary unit. The function $X(\omega)$ of the frequency region of the vibration waveform detected by the first vibration detection unit 22a and the transmission function $G(\omega)$ are an integration of the polar expression. Further, "Gain" and "Phase", which are transmission functions of each frequency, are saved in advance in the database 7.

The input information identification module 25 performs reverse transformation of the frequency on a function $Y(\omega)$ that is acquired by integrating the function $X(\omega)$ with the transmission function $G(\omega)$. $Y(\omega)$ that is the integration of the function $X(\omega)$ and the transmission function $G(\omega)$ shows the vibration waveform passed through the in-apparatus transmitting path 200 estimated from the vibration waveform detected by the first vibration detection unit 22a. It is the vibration waveform in the frequency region, so that a reverse Fourier transformation is performed to have it transformed to the time region.

As described, the input information identification module 25 according to the second exemplary embodiment estimates the vibration waveform that reaches the first vibration detection unit 22a or the second vibration detection unit 23 through the in-apparatus transmitting path 200 by using the transmission function of the in-apparatus transmitting path 200 stored in advance in the database 27, subtracts the estimated waveform from the vibration waveforms detected by the first vibration detection unit 22a and the second vibration detection unit 23, and calculates the detecting time difference by using the acquired waveform.

Figure 23:
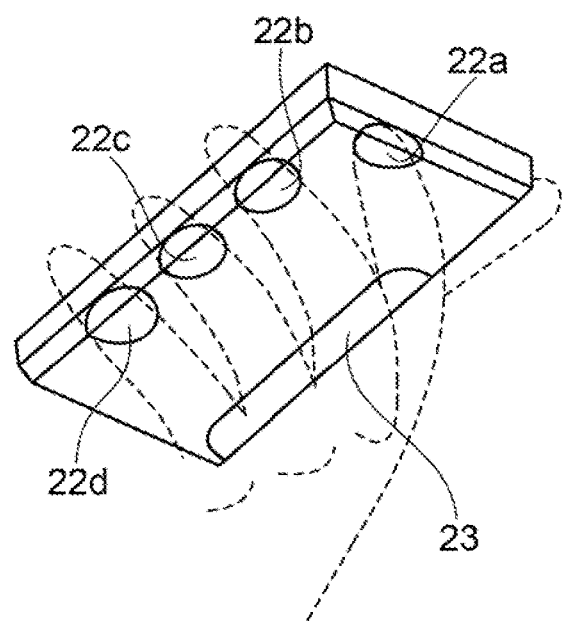
FIG. 23 is an illustration showing another example of the external view of the mobile apparatus according to the exemplary embodiment disclosed in FIGS. 16A and 16B.

Note here that the mobile apparatus 20 according to the second exemplary embodiment is not limited only to the card type shown in FIGS. 16A, 16B and FIG. 17. It is also possible to employ a structure in which the first detection units 22a to 22d and the second vibration detection unit 23 are disposed on the apparatus side face to detect the vibrations in the coaxial direction as shown in FIG. 23.

Further, while the input information identification module 25 transforms the waveform detected by the first vibration detection unit 22a into the frequency region once, performs integration with the transmission function, and reverse-transforms it to the time region to calculate the waveform transmitted through the in-apparatus transmitting path 200, calculation of the waveform is not limited only to such case. It is also possible to calculate the waveform transmitted through the in-apparatus transmitting path 200 by using "Gain" that is the amplitude ratio of the vibration frequency of the main component of the vibration of the hand generated by a tap action of the user and "Phase" that is the vibration phase difference. In that case, the input information identification module 25 multiplies the amplitude of the vibration waveform from the first vibration detection unit 22 with "Gain" that is the amplitude ratio and divides "Phase" that is the vibration phase difference with the vibration frequency that is the main component of the vibration to shift it for an amount of the time phase difference. Thereby, the vibration waveform transmitted through the in-apparatus transmitting path 200 can be calculated. With such structure, the main components of the vibrations generated by the tap actions need to be almost equal, and it is limited to perform specific input actions. However, it is unnecessary to perform the frequency transformation and the reverse frequency transformation, which are transformations between the time region and the frequency region, in order to calculate the vibration waveform transmitted through the in-apparatus transmitting path 200. Therefore, it is possible to reduce the calculation amount.

Further, the input information identification module 25 performs the transformation to the frequency region and the reverse transformation. Thus, it is possible to employ a structure which eliminates the noise on the waveform detected by the first vibration detection unit 22 and the second vibration detection unit 23 by a filter at this point.

Further, regarding the input device 29 of the second exemplary embodiment, the first vibration detection unit 22a to 22d and the second vibration detection unit 23 may be formed in a structure as shown in FIG. 13, and the vibration-proof material 44 may be utilized at a part such as the wiring board 43 where the vibration detecting sensor 42 is fixed to the casing so as to employ it as a combination with a method that passively damps the vibration transmitting through the in-apparatus transmitting path 200.

Next, actions of the mobile apparatus 20 according to the second exemplary embodiment will be described. Hereinafter, provided is an explanation of the actions of the mobile apparatus 20 of the second exemplary embodiment in a case where the thumb of the user touches the first vibration detection unit 22a and the forefinger touches the second vibration detection unit 23.

Figure 24:
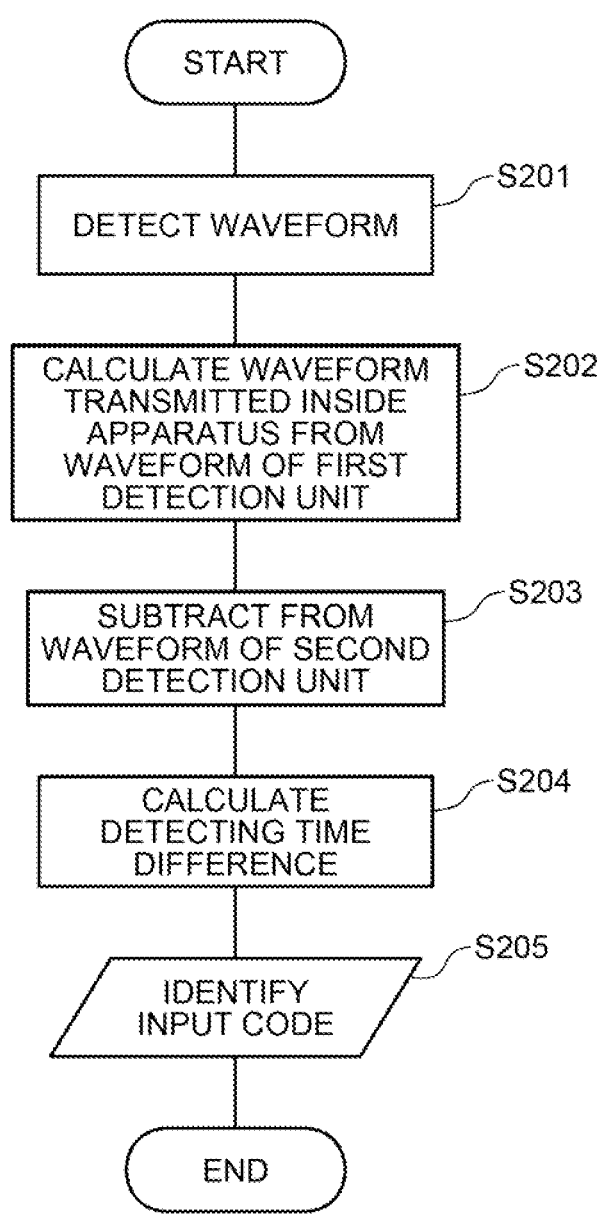
FIG. 24 is a flowchart showing actions of the mobile apparatus according to the exemplary embodiment disclosed in FIGS. 16A and 16B.

FIG. 24 is a flowchart showing the actions of the input information identification module 25. As shown in FIG. 24, the input information identification module 25 first inputs signal waveforms of a prescribed time length from the first vibration detection unit 22a and the second vibration detection unit 23 (step s201 of FIG. 24).

Based on the signal waveform from the first vibration detection unit 22a, an estimated value of the signal waveform that reaches the second vibration detection unit 23 through the in-apparatus transmitting path 200 is calculated (step s202 of FIG. 24). The waveform reaching the second vibration detection unit 23 through the body transmitting path 100 is calculated by subtracting this signal waveform from the signal waveform detected by the second vibration detection unit 23 (step s203 of FIG. 24). The detecting time difference between the waveform reaching the second vibration detection unit 23 through the body transmitting path 100 and the signal waveform detected by the first vibration detection unit 22 is calculated (step s204 of FIG. 24). Then, a code signal corresponding to the detecting time difference is selected from the table data stored in the database 27, and the code signal is outputted to the information presentation module 8 (step s205 of FIG. 24).

Next, the action (step s202 of FIG. 24) for calculating the signal waveform of the in-apparatus transmitting path 200 executed by the input information identification module 25 will be described in more details.

Figure 25:
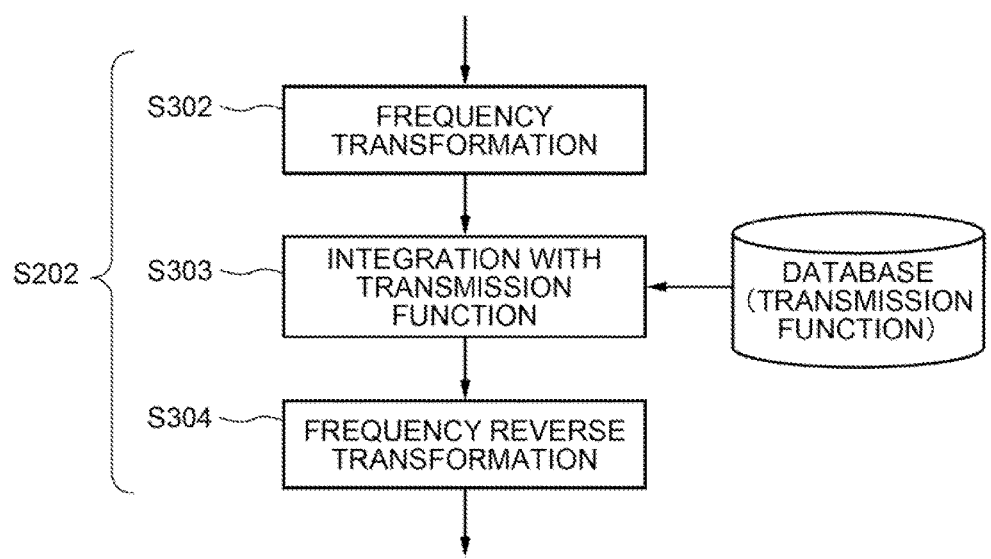
FIG. 25 is a flowchart showing actions of the mobile apparatus according to the exemplary embodiment disclosed in FIGS. 16A and 16B.

FIG. 25 is a flowchart showing the action of calculating the waveform transmitted inside the apparatus executed by the input information identification module 25. Upon receiving the vibration waveforms from the first vibration detection unit 22a and the second vibration detection unit 23, the input information identification module 25 first transforms the signal waveform from the first vibration detection unit 22a to the frequency region from the time region by using Fast Fourier Transformation (step s302 of FIG. 25).

The transmission function of the in-apparatus transmitting path 200 is read out from the database 7, and it is integrated with the signal waveform from the first vibration detection unit 22a being transformed into the frequency region (step s303 of FIG. 25). Then, reverse Fourier Transformation is performed on the function acquired by the integration to transform it from the frequency region to the time region (step s304 of FIG. 25).

In a process of calculating the vibration waveform of the in-apparatus transmitting path 200 based on the first vibration detection unit 22 (step s202 of FIG. 24), the calculation may be done by using "Gain" that is the amplitude ratio of the vibration frequency of the main component of the vibration generated by a tap action and "Phase" that is the vibration phase difference. In that case, the vibration waveform that transmits only through the in-apparatus transmitting path 200 can be calculated by multiplying the amplitude of the vibration waveform from the first vibration detection unit 22 with "Gain" that is the amplitude ratio, and shifting it for an amount of the time phase difference that is acquired by dividing "Phase" that is the vibration phase difference with the vibration frequency that is the main component of the vibration.

(Third Exemplary Embodiment)

Next, a third exemplary embodiment according to the invention will be described.

FIG. 24 is an external view showing the structure of a mobile apparatus 30 according to the third exemplary embodiment. FIG. 24A and FIG. 24B are perspective views of the mobile apparatus 30 of the third exemplary embodiment, and FIG. 24C is a front view of the mobile apparatus 30 of the third exemplary embodiment.

As in the case of the mobile apparatus 10 according to the first exemplary embodiment shown in FIG. 1, the mobile apparatus 30 according to the third exemplary embodiment is structured by including: an input unit 34 configured with first vibration detection units 32a, 32b, 32c and second vibration detection unit 33; an input device 39 including an input information identification module 35, a timer management control unit 36, and a database 37; and an information presentation module 8.

As shown in FIG. 24A and FIG. 24B, the mobile apparatus 30 is in a structure in which only a frame provided on the side face slides, and the first vibration detection units 32a, 32b, 32c and the second vibration detection unit 33 are provided in that frame. The first vibration detection units 32a to 32c are disposed in the positions's that the second joints of a palm of a user that holds the mobile apparatus 30 come in contact, and the second vibration detection unit 33 is disposed in the position so that the thenar in the vicinity of the thumb of the palm comes in contact. As shown in FIG. 24C, the third exemplary embodiment is structured to place input areas C on the palm of the user.

In the third exemplary embodiment, the input areas C are allotted on a plane of the palm of the user. Thus, among a plurality of input areas C, it is defined as a third area C1, a second area C2, and a first area C1 in order closer to the second vibration detection unit 32. Further, the input areas C1 are allotted on one place, so that a vibration is detected by all of the first vibration detection units 32a to 32c when a force is applied to the input areas C.

Therefore, the input information identification module 35 is structured to: calculate the respective detecting time differences of the first vibration detection units 32a to 32c with respect to the second vibration detection unit 33; specifies the position of the input area C tapped by the user based on the mutual relation of the detecting time differences by referring to the data table stored in the database 37; and output a code signal corresponding to the position. Thereby, it is possible to set the input areas C that are arranged two dimensionally on a plane such as a palm.

FIG. 27 is a chart showing an example of the data table stored in the database unit 37. This data table is information showing the corresponding relation between the upper-limit threshold values and the lower-limit threshold values of the vibration transmitting time differences regarding each of the first vibration detection units 32a to 32c with respect to the second vibration detection unit 33 and code signals.

Figure 26A:
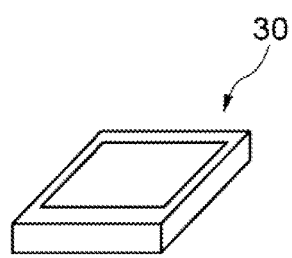
FIGS. 26A, 26B, and 26C show external views of a mobile apparatus according to a third exemplary embodiment of the invention.
Figure 26B:
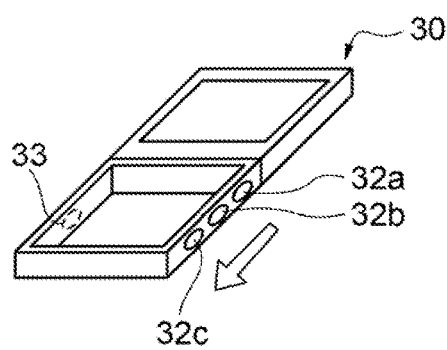
Figure 26C:
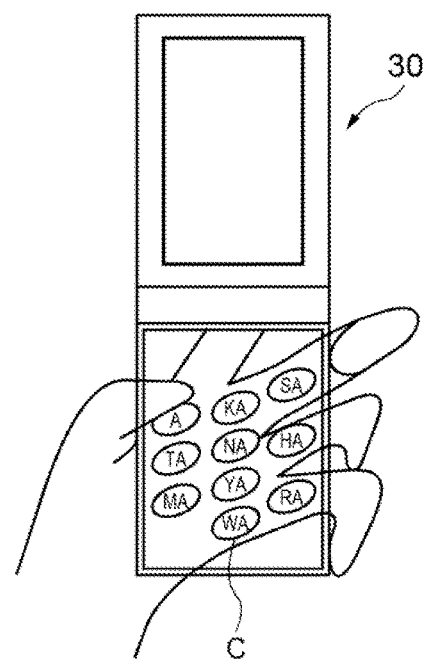

FIG. 27 is a data table of a case where the input areas C are set in a layout as shown in FIG. 26C. In that case, "ta" in Japanese is at a position close to the second vibration detection unit 33, and the vibration from the position of "ta" is detected by the first vibration detection units 32a to 32c later than by the second vibration detection unit 33. Thus, as the transmitting time difference corresponding to "ta", the lower-limit threshold value and the upper-limit threshold value are set centering on plus values where the phase is in delay. The vibration from the position of "na" is detected almost simultaneously by the first vibration detection units 32a to 32c and the second vibration detection unit 33, so that the time difference is small as the transmitting time difference corresponding to "ta" and the lower-limit threshold value as well as the upper-limit threshold value are set centering on the values in the vicinity of "0". Further, "ha" is disposed at a position close to the first vibration detection unit 32b and the vibration from the position of "ha" is detected by the first vibration detection units 32a to 32c earlier than by the second vibration detection unit 33. Thus, as the transmitting time difference corresponding to "ha", the lower-limit threshold value and the upper-limit threshold value are set centering on minus values where the phase is in lead.

In the meantime, comparing the respective vibration transmitting time differences of the first vibration detection units 32a, 32b, 32c with respect to the second vibration detection unit 33, the first vibration detection unit 32b to which the third finger comes in contact is the closest to "ha". Thus, the detecting time difference between the first vibration detection unit 32b and the second vibration detection unit 33 is set to be the largest. Similarly, the first vibration detection unit 32a to which the middle finger comes in contact is the closest to "sa", so that the detecting time difference between the first vibration detection unit 32a and the second vibration detection unit 33 is set to be the largest.

While the present invention has been described by referring to the embodiments (and examples), the present invention is not limited only to those embodiments (and examples) described above. Various kinds of modifications that occur to those skilled in the art can be applied to the structures and details of the present invention within the scope of the present invention.

INDUSTRIAL APPLICABILITY

Since the hand of the user that holds the apparatus main body can be used as the input unit, it is possible to be applied to mobile phones whose main body is desired to be reduced in size.

REFERENCE NUMERALS 2a-2d, 22a-22d, 32a-32c First vibration detection unit
3, 23, 33 Second vibration detection unit
4, 24 Input unit
5, 25 Input information identification module
6, 26 Timer management control module
7, 27 Database
8 Information presentation module
9, 29 Input device
10, 20, 30 Mobile apparatus
41 Key top
42 Vibration detecting sensor
43 Wiring board
44 Vibration-proof material
100 Body transmitting path
200 In-apparatus transmitting path

The invention claimed is:

1. An information input device, comprising:
a first vibration detection unit which detects a vibration generated by a tap operation and transmitted through a body of a user from a first part of the body of the user to the first vibration detection unit when the first part of the body of the user is tapped by a second part of the body of the user;
a second vibration detection unit disposed at a position different from a vibration detecting position of the first vibration detection unit, which detects the vibration generated by the tap operation and transmitted through the body of the user from the first part of the body of the user to the second vibration detection unit; and
an input information identification module which calculates a detecting time difference that is a difference of detecting time by having one of the vibrations detected by the first vibration detection unit and detected by the second vibration detection unit as a reference, and identifies the tapped position in the body of the user based on the time difference by searching a data table, stored in a database in advance, where a corresponding relation between detecting time differences and tapped positions in the body of the user is set with a plurality of threshold values which are set based on a standard deviation of a plurality of test data, wherein
the plurality of threshold values are set, corresponding to the tapped positions, on the basis of the standard deviation such that the plurality of threshold values do not overlap with each other, wherein
the first part is a finger of one of a left hand and a right hand,
the second part is a finger of the other of the left hand and the right hand,
the first vibration detection unit is placed at a fingertip of the finger of the one of the left hand and the right hand, and
the second vibration detection unit is placed at a base part of the finger of the one of the left hand and the right hand.

2. The information input device as claimed in claim 1, comprising
the database which stores in advance the data table, wherein
the input information identification module searches the data table stored in the database, and identifies the tapped position corresponding to the calculated detecting time difference.

3. The information input device as claimed in claim 1, wherein
the input information identification module outputs a code signal corresponding to the identified tapped position.

4. The information input device as claimed in claim 1, wherein
the input information identification module estimates a vibration component when the vibration detected by one of the first vibration detection unit and the second vibration detection unit enters inside the device and propagates to the other detection unit according to a transmission function set in advance, and calculates the detecting time difference by taking a value acquired by subtracting the estimated vibration component from the other detected vibration as a detected vibration of the other detection unit.

5. The information input device as claimed in claim 1, wherein
the first vibration detection unit and the second vibration detection unit include a vibration-proof material for blocking a vibration that becomes a noise for detecting the vibration from the body of the user.

6. The information input device as claimed in claim 1, wherein
the first vibration detection unit and the second vibration detection unit include a sensor for detecting vibrations of one or more directions.

7. The information input device as claimed in claim 1, comprising
a plurality of the first vibration detection units, wherein
the information input identification module individually calculates differences in detecting time at which the vibration is detected by the plurality of first vibration detection units and detecting time at which the vibration is detected by the second vibration detection unit, and identifies the tapped position based on a plurality of detecting time differences.

8. The information input device as claimed in claim 2, wherein:
the database stores a data table in which a corresponding relation between the detecting time differences and the tapped positions based on physical features of the body is set.

9. A mobile apparatus, comprising the information device as claimed in claim 1 loaded thereon.

10. An information input method, comprising:
detecting a vibration generated by a tap operation and transmitted through a body of a user from a first part of the body of the user to a first vibration detecting position when the first part of the body of the user is tapped by a second part of the body of the user, and detecting at a second vibration detecting position different from the first vibration detecting position the vibration generated by the tap operation and transmitted through the body of the user from the first part of the body of the user to the second vibration detecting position;
calculating a detecting time difference that is a difference of detecting time by having one of the two detected vibrations as a reference; and
identifying the tapped position in the body of the user based on the time difference by searching a data table, stored in a database in advance, where a corresponding relation between detecting time difference and tapped positions in the body of the user is set with a plurality of threshold values which are set based on a standard deviation of a plurality of test data, wherein
the plurality of threshold values are set, corresponding to the tapped positions, on the basis of the standard deviation such that the plurality of threshold values do not overlap with each other, wherein
the first part is a finger of one of a left hand and a right hand,
the second part is a finger of the other of the left hand and the right hand,
the first vibration detection unit is placed at a fingertip of the finger of the one of the left hand and the right hand, and
the second vibration detection unit is placed at a base part of the finger of the one of the left hand and the right hand.

11. The information input method as claimed in claim 10, comprising
outputting a code signal corresponding to the identified tapped position, after identifying the tapped position in the body of the user.

12. The information input method as claimed in claim 10, comprising
estimating a vibration component when one of the detected vibrations transmits outside the body of the user and reaches the other detecting position according to a transmission function set in advance, and calculating the detecting time difference by taking a value acquired by subtracting the estimated vibration component from the other detected vibration as the other detected vibration.

13. The information input method as claimed in claim 10, comprising:
detecting the vibration at three or more points of the body of the user; and
individually calculating differences in regards to detecting time at which the vibration is detected by a given vibration detecting position and detecting time at which the vibration is detected by each of the other detecting positions by having the vibration detected at the given detecting position as a reference, and identifying the tapped position based on a plurality of detecting time differences.

14. A non-transitory computer readable recording medium storing an information input program, which causes a computer to execute:
a function which inputs vibration information outputted from first and second vibration detection units which detect, at different positions in a body of a user, a vibration generated by a tap operation and transmitted through the body of the user from a first part of the body of the user to the first vibration detection unit and from the first part of the body of the user to the second vibration detection unit when the first part of the body of the user is tapped by a second part of the body of the user;
a detecting time difference calculating function which calculates a detecting time difference that is a difference of detecting time by having one of the both inputted vibration information as a reference; and
an input information identifying function which identifies the tapped position in the body of the user based on the time difference by searching a data table, stored in a database in advance, where a corresponding relation between detecting time difference and tapped positions in the body of the user is set with a plurality of threshold values which are set based on a standard deviation of a plurality of test data, wherein
the plurality of threshold values are set, corresponding to the tapped positions, on the basis of the standard deviation such that the plurality of threshold values do not overlap with each other, wherein
the first part is a finger of one of a left hand and a right hand,
the second part is a finger of the other of the left hand and the right hand,
the first vibration detection unit is placed at a fingertip of the finger of the one of the left hand and the right hand, and the second vibration detection unit is placed at a base part of the finger of the one of the left hand and the right hand.

15. The non-transitory computer readable recording medium storing the information input program as claimed in claim 14, wherein
the input information identifying function is a function which outputs a code signal corresponding to the identified tapped position.

16. The non-transitory computer readable recording medium storing the information input program as claimed in claim 14, wherein
the detecting time difference calculating function is a function which estimates a vibration component when one of the vibrations detected by the first and second vibration detection units transmits outside the body of the user and reaches the other detecting position according to a transmission function set in advance, and calculates the detecting time difference by taking a value acquired by subtracting the estimated vibration component from the other detected vibration as the other detected vibration.

17. An information input device, comprising:
first vibration detection means for detecting a vibration generated by a tap operation and transmitted through a body of a user from a first part of the body of the user to the first vibration detection means when the first part of the body of the user is tapped by a second part of the body of the user;
second vibration detection means disposed at a position different from a vibration detecting position of the first vibration detection means for detecting the vibration generated by the tap operation and transmitted through the body of the user from the first part of the body of the user to the second vibration detection means; and
input information identification means for calculating a detecting time difference that is a difference of detecting time by having one of the vibrations detected by the first vibration detection means and detected by the second vibration detection means as a reference, and identifies the tapped position in the body of the user based on the time difference by searching a data table, stored in a database in advance, where a corresponding relation between detecting time difference and tapped positions in the body of the user is set with a plurality of threshold values which are set based on a standard deviation of a plurality of test data, wherein
the plurality of threshold values are set, corresponding to the tapped positions, on the basis of the standard deviation such that the plurality of threshold values do not overlap with each other, wherein
the first part is a finger of one of a left hand and a right hand,
the second part is a finger of the other of the left hand and the right hand,
the first vibration detection unit is placed at a fingertip of the finger of the one of the left hand and the right hand, and
the second vibration detection unit is placed at a base part of the finger of the one of the left hand and the right hand.

* * * * *